US007773323B2

(12) United States Patent
Kaizu et al.

(10) Patent No.: US 7,773,323 B2
(45) Date of Patent: *Aug. 10, 2010

(54) MAGNETIC RECORDING MEDIUM, RECORDING REPRODUCING APPARATUS, AND STAMPER

(75) Inventors: Akimasa Kaizu, Tokyo (JP); Yoshikazu Soeno, Tokyo (JP); Makoto Moriya, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/412,600

(22) Filed: Mar. 27, 2009

(65) Prior Publication Data

US 2009/0185308 A1    Jul. 23, 2009

Related U.S. Application Data

(62) Division of application No. 11/353,933, filed on Feb. 15, 2006, now Pat. No. 7,532,423.

(30) Foreign Application Priority Data

Feb. 16, 2005 (JP) ............................. 2005-039143

(51) Int. Cl.
G11B 5/09 (2006.01)
(52) U.S. Cl. ............................. 360/48; 360/15; 360/53; 360/77.02; 360/77.08
(58) Field of Classification Search ...................... None
See application file for complete search history.

(56) References Cited

U.S. PATENT DOCUMENTS 5,590,009 A * 12/1996 Ishida ......................... 360/135
5,615,058 A *  3/1997 Chainer et al. ................. 360/51
5,659,436 A *  8/1997 Yarmchuk et al. ............. 360/75
5,905,603 A *  5/1999 Ogasawara et al. ....... 360/77.08

(Continued)

FOREIGN PATENT DOCUMENTS

JP           3-225684           10/1991

(Continued)

OTHER PUBLICATIONS

English Language Abstract and computer-generated translation of JP 6-111502.

(Continued)

*Primary Examiner*—Dismery E Mercedes
(74) *Attorney, Agent, or Firm*—Greenblum & Bernstein P.L.C.

(57) ABSTRACT

On a magnetic recording medium, M sets of burst patterns are formed along a direction of rotation of a substrate in each burst pattern region. Each burst pattern is formed so as to include two types of burst signal units that have an equal length along a radial direction of the substrate. In a predetermined range, (2M) centers in the radial direction of the burst patterns are present at intervals of (1/N) times the track pitch in the radial direction. The predetermined range has a length along the radial direction of (2M/N) times the track pitch. M or N is a natural number of 2 or higher. The two types of burst signal units are formed of non-recording regions and end regions of the burst signal units overlap in the radial direction in at least one part region of the substrate.

3 Claims, 14 Drawing Sheets

U.S. PATENT DOCUMENTS

| | | | |
|---|---|---|---|
| 6,005,740 A * | 12/1999 | Liikanen | 360/77.08 |
| 6,025,970 A * | 2/2000 | Cheung | 360/77.08 |
| 6,088,200 A * | 7/2000 | Morita | 360/135 |
| 6,262,860 B1 * | 7/2001 | Ishida | 360/78.05 |
| 6,760,184 B1 | 7/2004 | Cunningham | |
| 6,791,778 B2 * | 9/2004 | Chu et al. | 360/53 |
| 7,085,084 B2 * | 8/2006 | Yasuna et al. | 360/51 |
| 7,345,838 B2 | 3/2008 | Sakurai et al. | |
| 7,423,825 B2 * | 9/2008 | Shimamura et al. | 360/31 |
| 7,474,506 B2 | 1/2009 | Soeno et al. | |
| 7,532,423 B2 * | 5/2009 | Kaizu et al. | 360/48 |
| 7,548,388 B2 * | 6/2009 | Kaizu et al. | 360/48 |
| 2004/0061968 A1 * | 4/2004 | Fukushima et al. | 360/75 |
| 2005/0094298 A1 * | 5/2005 | Sakurai et al. | 360/15 |
| 2005/0117253 A1 * | 6/2005 | Moriya et al. | 360/135 |
| 2005/0213235 A1 * | 9/2005 | Yasunaga | 360/17 |
| 2005/0219730 A1 * | 10/2005 | Sakurai et al. | 360/48 |
| 2005/0254160 A1 * | 11/2005 | Bandic et al. | 360/77.08 |
| 2005/0263915 A1 | 12/2005 | Fujita et al. | |
| 2005/0286155 A1 | 12/2005 | Tagami et al. | |
| 2006/0044687 A1 | 3/2006 | Soeno et al. | |
| 2006/0066975 A1 | 3/2006 | Soeno et al. | |
| 2006/0176606 A1 | 8/2006 | Soeno et al. | |
| 2006/0193083 A1 | 8/2006 | Soeno et al. | |
| 2006/0198052 A1 | 9/2006 | Soeno et al. | |
| 2006/0203368 A1 | 9/2006 | Kaizu et al. | |
| 2006/0203386 A1 | 9/2006 | Soeno et al. | |

FOREIGN PATENT DOCUMENTS

| | | |
|---|---|---|
| JP | 5-282807 | 10/1993 |
| JP | 5-298840 | 11/1993 |
| JP | 6-111502 | 4/1994 |
| JP | 7-287950 | 10/1995 |
| JP | 7-287951 | 10/1995 |
| JP | 8-339649 | 12/1996 |
| JP | 11-161944 | 6/1999 |
| JP | 2004-110896 | 4/2004 |

OTHER PUBLICATIONS

English language Abstract and computer-generated translation of JP 7-287950.

English language Abstract and computer-generated translation of JP 5-298840.

English language Abstract and computer-generated translation of JP 11-161944.

English language Abstract of JP 3-225684.

English language Abstract of JP 2004-110896.

English language Abstract of JP 5-282807.

English language Abstract of JP 7-287951.

English language Abstract of JP 8-339649.

* cited by examiner

F I G. 5
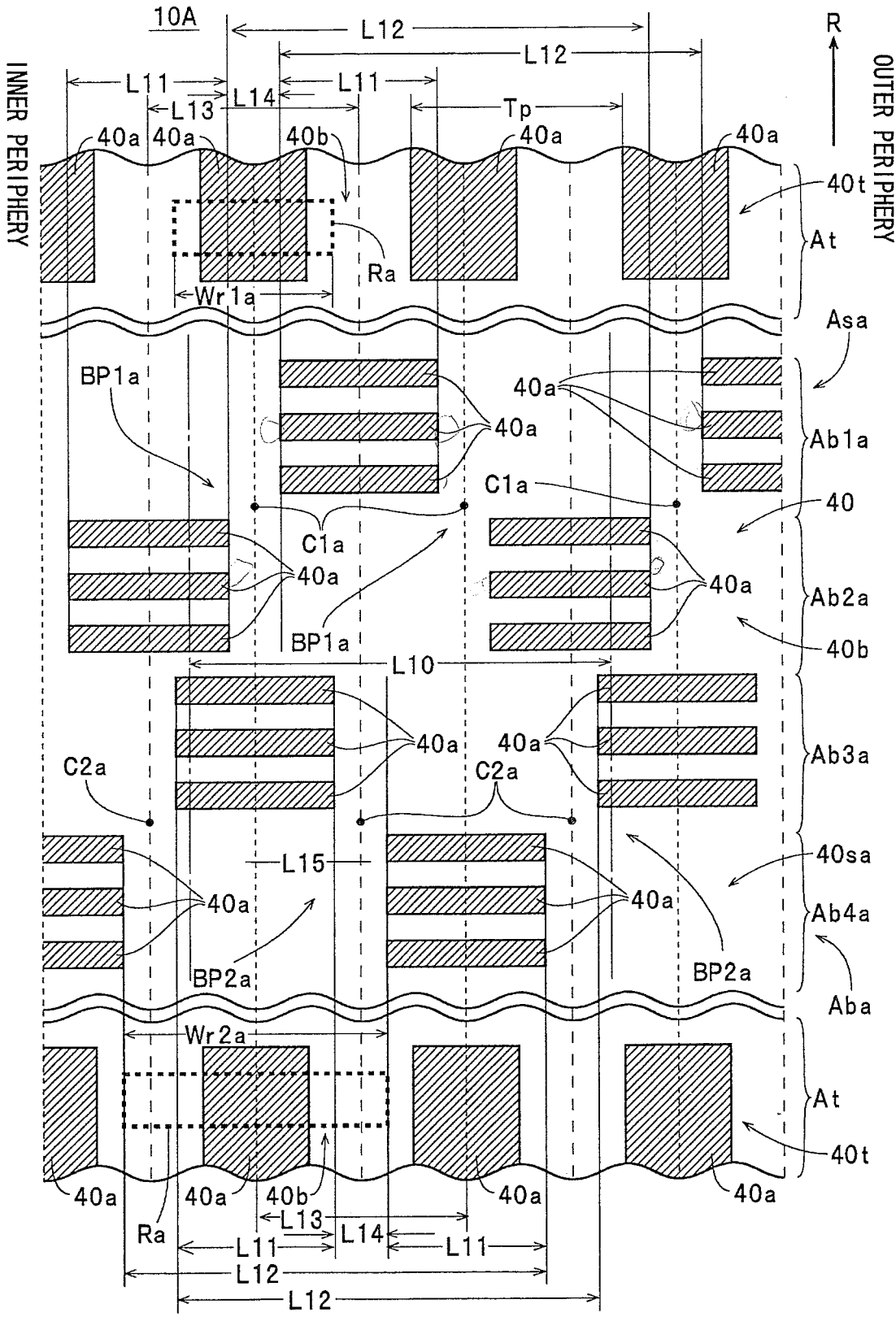

F I G. 1 2
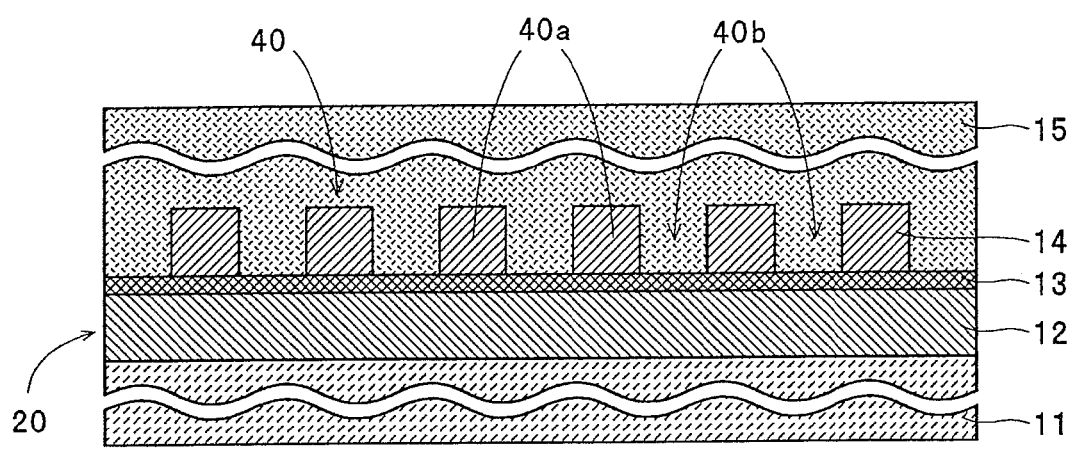
F I G. 1 3
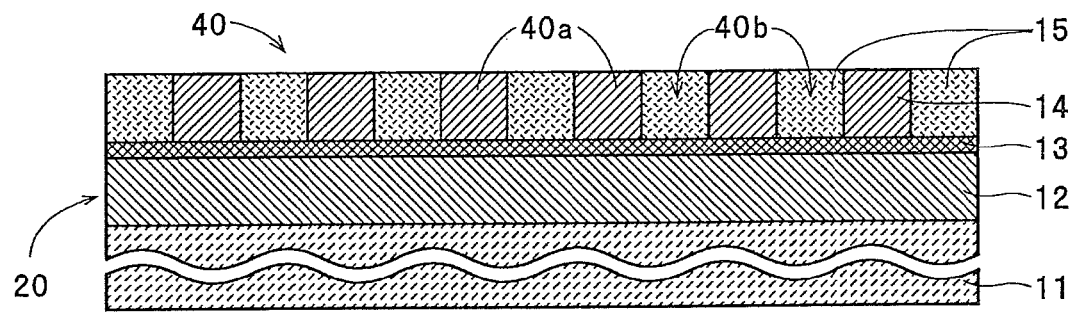

MAGNETIC RECORDING MEDIUM, RECORDING REPRODUCING APPARATUS, AND STAMPER

CROSS-REFERENCE TO RELATED APPLICATIONS

This application is a divisional of U.S. patent application Ser. No. 11/353,933 filed on Feb. 15, 2006, which claims priority to Japanese Application No. 2005-039143, filed Feb. 16, 2005, the contents of which are expressly incorporated by reference in their entireties.

BACKGROUND OF THE INVENTION

1. Field of the Invention

The present invention relates to a magnetic recording medium on which burst patterns are formed by patterns that include recording regions and non-recording regions, a recording/reproducing apparatus equipped with the magnetic recording medium, and a stamper for manufacturing the magnetic recording medium.

2. Description of the Related Art

As examples of this type of magnetic recording medium and recording/reproducing apparatus, Japanese Laid-Open Patent Publication No. H06-111502 discloses a magnetic disk apparatus equipped with a magnetic disk on which recording track patterns and servo patterns are formed by concave/convex patterns. On the magnetic disk provided in the magnetic disk apparatus, the recording track patterns and the servo patterns are formed by concave/convex patterns formed in a magnetic layer on a disk substrate. More specifically, as shown in FIG. 22, on a conventional magnetic disk (hereinafter referred to as a "magnetic disk 10x1"), a plurality of track patterns Pw formed in belt-like shapes along the direction of rotation of the magnetic disk 10x1 (the direction of the arrow R shown in FIG. 22) and servo patterns Ps1, Ps2 formed in servo pattern regions are formed by the concave/convex patterns described above. Note that on the magnetic disk 10x1 shown in FIG. 22 and a magnetic disk 10x2 shown in FIG. 23 described later, formation regions of convex parts (recording regions) in the concave/convex patterns are shown by obliquely shaded areas and formation regions of concave parts (non-recording regions) in the concave/convex patterns are shown by the non-shaded (i.e., white) regions.

The servo patterns Ps1, Ps2, . . . are servo patterns used to detect the position of a magnetic head and thereby make the magnetic head on-track to a desired track pattern Pw. The servo patterns Ps1, Ps2 are formed as a pair to function as a burst pattern. Also, on the magnetic disk 10x1, the widths Ts of the servo patterns Ps1, Ps2 are equal to the formation pitch of the track patterns Pw (referred to as the "track pitch Tp") and both ends in the radial direction of the servo patterns Ps1, Ps2 are positioned so as to match the centers of the track patterns Pw (the positions shown by broken lines in FIG. 22: centers of the tracks). The formation positions of the servo patterns Ps1, Ps2 differ by the track pitch Tp in the radial direction of the magnetic disk 10x1 and are separated from one another in the direction of rotation.

On the other hand, another magnetic disk (hereinafter referred to as "magnetic disk 10x2") on which four types of pattern, servo patterns Ps1 to Ps4, are formed as shown in FIG. 23 is disclosed in the same publication. On the magnetic disk 10x2, the servo patterns Ps1, Ps2 form a pair and function as a set of burst patterns, and the servo patterns Ps3, Ps4 form a pair and function as another set of burst patterns. Also, on the magnetic disk 10x2, the widths Ts of the servo patterns Ps1 to Ps4 are formed so as to be double the track pitch Tp. In addition, on the magnetic disk 10x2, both ends in the radial direction of the servo patterns Ps1, Ps2 are formed so as to match the centers (the positions shown by broken lines in FIG. 23: centers of the tracks) of track patterns Pw, and both ends in the radial direction of the servo patterns Ps3, Ps4 are formed so as to match the centers of other track patterns Pw. The formation positions of the servo patterns Ps1, Ps2 differ by double the track pitch Tp in the radial direction of the magnetic disk 10x2 and are separated from one another in the direction of rotation. The formation positions of the servo patterns Ps3, Ps4 also differ by double the track pitch Tp in the radial direction and are separated from one another in the direction of rotation. In addition, the servo patterns Ps1 to Ps4 are formed so that the center in the radial direction of a burst pattern composed of the servo patterns Ps1, Ps2 and the center in the radial direction of a burst pattern composed of the servo patterns Ps3, Ps4 differ by the track pitch Tp in the radial direction.

SUMMARY OF THE INVENTION

However, by investigating the conventional magnetic disks 10x1, 10x2, the present inventors discovered the following problem. That is, to make present-day magnetic disks capable of high-density recording, it is necessary to increase the track density of data recording tracks. Accordingly, there is a tendency to reduce the length in the radial direction of the burst patterns (the servo patterns Ps1, Ps2, . . . described above), so that for magnetic recording media including the conventional magnetic disks 10x1, 10x2, the output signal outputted from a magnetic head when a burst pattern passes below the magnetic head tends to become weak. This means that for this type of magnetic recording media, there is a tendency for reduced sensitivity for a PES (Position Error Signal) as the recording density increases, which can make it difficult to carry out tracking servo control properly.

Also, on the conventional magnetic disk 10x1, since there is only one set of burst patterns composed of the servo patterns Ps1, Ps2, it is necessary to specify a position of the magnetic head along the radial direction based on the PES when a single set of burst patterns passes below the magnetic head. However, as shown in FIG. 22, on the conventional magnetic disk 10x1, since the width Ts of the servo patterns Ps1 and Ps2 is equal to the track pitch Tp, if the width Wr1x of a reproducing element Rx of the magnetic head is narrower than the track pitch Tp, the signal level of the output signal from the magnetic head will have the same level when an inner periphery side of the servo pattern Ps1 passes below the reproducing element Rx (when the reproducing element Rx passes above a position P11 on the magnetic disk 10x1) and when an outer periphery side of the servo pattern Ps1 passes below the reproducing element Rx (when the reproducing element Rx passes above a position P12 on the magnetic disk 10x1), for example. This means dead zones for detecting the position of the magnetic head are produced, and therefore it is difficult to specify over which of the positions P11 and P12 the reproducing element Rx is positioned based on the PES.

Similarly, if the width Wr2x of the reproducing element Rx of the magnetic head is wider than the track pitch Tp (the width Ts), the signal level of the output signal from the magnetic head will have the same level when the servo pattern Ps1 passes below the inner periphery side of the reproducing element Rx (when the reproducing element Rx passes above a position P13 on the magnetic disk 10x1), and when the servo pattern Ps1 passes below the outer periphery side of the reproducing element Rx (when the reproducing element Rx passes above a position P14 on the magnetic disk 10x1), for example. As a result, in this case also, dead zones are produced, so that it is difficult to specify over which of the positions P13 and P14 the reproducing element Rx is positioned based on the PES. Accordingly, since it is necessary to set the track pitch Tp and the width Ts so that the track pitch Tp (which is equal to the width Ts of the servo patterns Ps1, Ps2) and the length in the radial direction of the reproducing element Rx of the magnetic head match, there has been the problem of limited freedom for designing the data track patterns and servo patterns on the conventional magnetic disk 10x1 (i.e., limited freedom for the selection of pattern sizes).

On the other hand, the conventional magnetic disk 10x2 has two sets of burst patterns composed of the servo patterns Ps1 to Ps4, with the widths Ts of the servo patterns Ps1 to Ps4 being sufficiently wider than the track pitch Tp. This means that with the conventional magnetic disk 10x2, if the reproducing head width (the width of the reproducing element Rx) is wider than the track pitch Tp, it will be possible to specify a position along the radial direction of the magnetic head (the reproducing element Rx) based on the PES when either of the burst pattern composed of the servo patterns Ps1, Ps2 and the burst pattern composed of the servo patterns Ps3, Ps4 passes below the reproducing element Rx. This means that there is greater freedom for selecting a pattern size with the conventional magnetic disk 10x2 than with the magnetic disk 10x1.

However, on the conventional magnetic disk 10x2, as shown in FIG. 23, if the width Wr3x of the reproducing element Rx is narrower than the track pitch Tp (that is, narrower than half the width Ts of the servo patterns Ps1, Ps2), the signal level of the output signal from the magnetic head will have the same level when the inner periphery side of the servo pattern Ps3 passes below the reproducing element Rx after a center-right part of the servo pattern Ps1 has passed below the reproducing element Rx (i.e., when the reproducing element Rx passes in order above the positions P15, P17 on the magnetic disk 10x2) and when a center-left part of the servo pattern Ps3 passes below the reproducing element Rx after the outer periphery side of the servo pattern Ps1 has passed below the reproducing element Rx (i.e., when the reproducing element Rx passes in order above the positions P16, P18 on the magnetic disk 10x2). As a result, since dead zones are produced when the reproducing head width is narrower than the track pitch Tp, it will still be difficult to specify over which of the positions P15, P17 and P16, P18 the reproducing element Rx is positioned based on the PES. Accordingly, on the conventional magnetic disk 10x2, the track pitch Tp needs to be made narrower than the reproducing head width. This means that with the conventional magnetic disk 10x2, since a reproducing element Rx where the reproducing head width is greater than the track pitch Tp is used, there is the risk of a "side reading" phenomenon occurring where a magnetic signal is read from an adjacent track. In this way, with the conventional magnetic disk 10x2, there is the problem that it is difficult to increase the freedom with which the pattern size can be selected while avoiding the occurrence of side reading.

The present invention was conceived in view of the problems described above and it is a principal object of the present invention to provide a magnetic recording medium and a recording/reproducing apparatus that enable servo patterns and the like to be designed with greater freedom, can avoid side reading, and can also improve the sensitivity of a PES, and to also provide a stamper that can easily manufacture such magnetic recording medium.

To achieve the stated object, on a magnetic recording medium according to the present invention are formed: servo patterns formed in servo pattern regions on at least one surface of a substrate by patterns including recording regions and non-recording regions; and data track patterns where a plurality of data recording tracks are formed with a predetermined track pitch in data recording regions on the at least one surface, wherein M sets of burst patterns are formed along a direction of rotation of the substrate in a burst pattern region in each servo pattern region, where M is a natural number of two or higher, each burst pattern is formed so as to include two types of burst signal units that are positioned at different distances from a center of the data track patterns and have an equal length along a radial direction of the substrate, the length along the radial direction being (2·M/N) times the track pitch, where N is a natural number of two or higher, and so that in a predetermined range where both ends in the radial direction do not match a center in the radial direction of a burst pattern, (2·M) centers in the radial direction of the burst patterns are present at intervals of (1/N) times the track pitch in the radial direction, and the two types of burst signal units are constructed by the recording regions so that a first type of burst signal units and a second type of burst signal units out of the two types of burst signal units do not overlap in the direction of rotation, centers in the radial direction of the burst signal units of a same type are separated in the radial direction by (2·M/N) times the track pitch, centers in the radial direction of the first type of burst signal units and centers in the radial direction of the second type of burst signal units are separated in the radial direction by (M/N) times the track pitch, and wherein in at least one part out of regions from an inner periphery region to an outer periphery region of the substrate, end parts positioned close to the second type of burst signal units out of both end parts in the radial direction of the first type of burst signal units and end parts positioned close to the first type of burst signal units out of both end parts in the radial direction of the second type of burst signal units are separated in the radial direction via the non-recording regions. Note that the expression "recording region" in the present specification refers to a region constructed so as to be able to store a recorded magnetic signal in a readable manner (that is, a region with an ability to store a magnetic signal in a readable manner). Also, the expression "non-recording region" in the present specification refers to a region constructed so that the ability to store a recorded magnetic signal in a readable manner is lower than the ability of a recording region or to a region that effectively has no such ability. More specifically, a "non-recording region" for the present specification refers to a region from which a smaller magnetic field is produced in a state where a magnetic signal has been recorded than the magnetic field produced from a recording region or to a region from which a magnetic field is effectively not produced. In addition, in the present specification, a "value produced by multiplying two by M" is written as "2·M" and a "value produced by dividing one by N" is written as "1/N".

According to the above magnetic recording medium, by forming M sets of burst patterns, which include two types of burst signal units constructed of recording regions, along the direction of rotation of a substrate and forming the burst signal units so that in at least one part out of regions from an inner periphery region to an outer periphery region of the substrate, end parts s positioned close to the second type of burst signal units out of both end parts s in the radial direction of the first type of burst signal units and end parts s positioned close to the first type of burst signal units out of both end parts s in the radial direction of the second type of burst signal units are separated in the radial direction via non-recording regions, it is possible to sufficiently increase the amount by which the PES changes with respect to the amount by which the magnetic head (the reproducing element) moves relative to the magnetic recording medium (i.e., the PES sensitivity is sufficiently improved). As a result, even if the output signal from the magnetic head becomes weaker due to an increase in track density, it will still be possible to reliably detect extremely small displacements and properly carry out tracking servo control. Also, unlike the conventional magnetic disk $10x1$ where there is only one set of burst patterns, there is no need for the width of the reproducing element of the magnetic head to match the track pitch, and therefore the data track patterns and the servo patterns can be designed with increased freedom. Also, unlike the conventional magnetic disk $10x2$, the width of the reproducing element does not need to be wider than the track pitch, and therefore it is possible to sufficiently suppress "side reading".

On another magnetic recording medium according to the present invention are formed: servo patterns formed in servo pattern regions on at least one surface of a substrate by patterns including recording regions and non-recording regions; and data track patterns where a plurality of data recording tracks are formed with a predetermined track pitch in data recording regions on the at least one surface, wherein M sets of burst patterns are formed along a direction of rotation of the substrate in a burst pattern region in each servo pattern region, where M is a natural number of two or higher, each burst pattern is formed so as to include two types of burst signal units that are positioned at different distances from a center of the data track patterns and have an equal length along a radial direction of the substrate, the length along the radial direction being $(2 \cdot M/N)$ times the track pitch, where N is a natural number of two or higher, and so that in a predetermined range where both ends in the radial direction do not match a center in the radial direction of a burst pattern, $(2 \cdot M)$ centers in the radial direction of the burst patterns are present at intervals of $(1/N)$ times the track pitch in the radial direction, and the two types of burst signal units are constructed by the non-recording regions so that a first type of burst signal units and a second type of burst signal units out of the two types of burst signal units do not overlap in the direction of rotation, centers in the radial direction of the burst signal units of a same type are separated in the radial direction by $(2 \cdot M/N)$ times the track pitch, centers in the radial direction of the first type of burst signal units and centers in the radial direction of the second type of burst signal units are separated in the radial direction by $(M/N)$ times the track pitch, and in at least one part out of regions from an inner periphery region to an outer periphery region of the substrate, end regions including end parts positioned close to the second type of burst signal units out of both end parts in the radial direction of the first type of burst signal units and end regions including end parts positioned close to the first type of burst signal units out of both end parts in the radial direction of the second type of burst signal units overlap in the radial direction.

According to the above magnetic recording medium, by forming M sets of burst patterns, which include two types of burst signal units constructed of non-recording regions, along the direction of rotation of a substrate and forming the burst signal units so that in at least one part out of regions from an inner periphery region to an outer periphery region of the substrate, end regions including end parts positioned close to the second type of burst signal units out of both end parts in the radial direction of the first type of burst signal units and end regions including end parts positioned close to the first type of burst signal units out of both end parts in the radial direction of the second type of burst signal units overlap in the radial direction, it is possible to sufficiently increase the amount by which the PES changes with respect to the amount by which the magnetic head (the reproducing element) moves relative to the magnetic recording medium (i.e., the PES sensitivity is sufficiently improved). As a result, even if the output signal from the magnetic head becomes weaker due to an increase in track density, it will still be possible to reliably detect extremely small displacements and properly carry out tracking servo control. Also, unlike the conventional magnetic disk $10x1$ where there is only one set of burst patterns, there is no need for the width of the reproducing element of the magnetic head to match the track pitch, and therefore the data track patterns and the servo patterns can be designed with increased freedom. Also, unlike the conventional magnetic disk $10x2$, the width of the reproducing element does not need to be wider than the track pitch, and therefore it is possible to sufficiently suppress "side reading".

Also, a recording/reproducing apparatus according to the present invention includes: the magnetic recording medium described above where the burst signal units are constructed of the recording regions; a magnetic head that reads a control signal used for tracking servo control from the servo pattern regions of the magnetic recording medium; and a control unit that carries out the tracking servo control based on the control signal read via the magnetic head, wherein the burst patterns are formed on the magnetic recording medium so as to satisfy a condition "$(M+1) \cdot Tp/N - BW \leq Wr \leq (M-1) \cdot Tp/N + BW$" where Wr is a reproducing head width of the magnetic head, BW is a length along the radial direction of the burst signal units, and Tp is the track pitch. Note that the expression "reproducing head width of the magnetic head" in the present specification refers to a length in the width direction (the direction corresponding to the radial direction of the magnetic recording medium) of a surface of a reproducing element (an MR element or the like) of a magnetic head that faces the magnetic recording medium.

According to the above recording/reproducing apparatus, by forming the burst patterns of the magnetic recording medium so as to satisfy the condition "$(M+1) \cdot Tp/N - BW \leq Wr \leq (M-1) \cdot Tp/N + BW$", it is possible to sufficiently improve the PES sensitivity by using a magnetic head with a reproducing element with a width (Wr) that satisfies the above condition without producing dead zones for the burst patterns, which makes it possible to carry out proper tracking servo control. Here, unlike the conventional magnetic disk $10x1$, since the track pitch and the length along the radial direction of the burst signal units are not primarily determined by the width of the reproducing element, the data track patterns and the servo patterns can be designed with increased freedom. This means that the track pitch and the length along the radial direction of the burst signal units can be suitably changed in accordance with objects such as increasing the track density and avoiding side reading. Also, unlike the conventional magnetic disk $10x2$, the width of the reproducing element does not need to be made wider than the track pitch, and therefore side reading can be sufficiently avoided. By doing so, it is possible to provide a recording/reproducing apparatus equipped with a magnetic recording medium capable of high-density recording and not susceptible to reproducing errors.

Another recording/reproducing apparatus according to the present invention includes: the magnetic recording medium described above where the burst signal units are constructed of the non-recording regions; a magnetic head that reads a control signal used for tracking servo control from the servo pattern regions of the magnetic recording medium; and a control unit that carries out the tracking servo control based on the control signal read via the magnetic head, wherein the burst patterns are formed on the magnetic recording medium so as to satisfy a condition "(1−M)·Tp/N+BW≦Wr≦(3·M−1)·Tp/N−BW" where Wr is a reproducing head width of the magnetic head, BW is a length along the radial direction of the burst signal units, and Tp is the track pitch.

According to the above recording/reproducing apparatus, by forming the burst patterns of the magnetic recording medium so as to satisfy the condition "(1−M)·Tp/N+BW≦Wr≦(3·M−1)·Tp/N−BW", it is possible to sufficiently improve the PES sensitivity by using a magnetic head with a reproducing element with a width (Wr) that satisfies the above condition without producing dead zones for the burst patterns, which makes it possible to carry out proper tracking servo control. Here, unlike the conventional magnetic disk 10x1, since the track pitch and the length along the radial direction of the burst signal units are not primarily determined by the width of the reproducing element, the data track patterns and the servo patterns can be designed with increased freedom. This means that the track pitch and the length along the radial direction of the burst signal units can be suitably changed in accordance with objects such as increasing the track density and avoiding side reading. Also, unlike the conventional magnetic disk 10x2, the width of the reproducing element does not need to be made wider than the track pitch, and therefore side reading can be sufficiently avoided. By doing so, it is possible to provide a recording/reproducing apparatus equipped with a magnetic recording medium capable of high-density recording and not susceptible to reproducing errors.

A stamper according to the present invention has a concave/convex pattern including convex parts formed corresponding to one region out of the recording regions and the non-recording regions of the patterns on the magnetic recording medium described above where the burst signal units are constructed of the recording regions and concave parts formed corresponding to other regions in the patterns on the magnetic recording medium.

According to the stamper according to the present invention, by having a concave/convex pattern including convex parts formed corresponding to one region out of the recording regions and the non-recording regions of the patterns on the magnetic recording medium described above where the burst signal units are constructed of the recording regions and concave parts formed corresponding to other regions in the patterns on the magnetic recording medium, it is possible to easily manufacture, using a method such as imprinting, a magnetic recording medium with burst patterns that can sufficiently increase the amount by which the PES changes with respect to the movement amount of the magnetic head (the reproducing element) (i.e., burst patterns that can sufficiently improve the PES sensitivity).

Another stamper according to the present invention has a concave/convex pattern including convex parts formed corresponding to one region out of the recording regions and the non-recording regions of the patterns on the magnetic recording medium described above where the burst signal units are constructed of the non-recording regions and concave parts formed corresponding to other regions in the patterns on the magnetic recording medium.

According to the stamper according to the present invention, by having a concave/convex pattern including convex parts formed corresponding to one region out of the recording regions and the non-recording regions of the patterns on the magnetic recording medium described above where the burst signal units are constructed of the non-recording regions and concave parts formed corresponding to other regions in the patterns on the magnetic recording medium, it is possible to easily manufacture, using a method such as imprinting, a magnetic recording medium with burst patterns that can sufficiently increase the amount by which the PES changes with respect to the movement amount of the magnetic head (the reproducing element) (i.e., burst patterns that can sufficiently improve the PES sensitivity).

It should be noted that the disclosure of the present invention relates to a content of Japanese Patent Application 2005-039143 that was filed on 16 Feb. 2005 and the entire content of which is herein incorporated by reference.

BRIEF DESCRIPTION OF THE DRAWINGS

These and other objects and features of the present invention will be explained in more detail below with reference to the attached drawings, wherein:

FIG. 5 is a plan view of the magnetic disk showing examples of burst patterns formed in a first burst region to fourth burst region in the burst pattern region;

FIG. 12 is a cross-sectional view of the preform in a state where a layer of non-magnetic material has been formed so as to cover the concave/convex pattern;

FIG. 13 is a cross-sectional view of a state where the surface of the non-magnetic material has been etched to become flat;

DESCRIPTION OF THE PREFERRED EMBODIMENTS

Preferred embodiments of a magnetic recording medium and a recording/reproducing apparatus according to the present invention will now be described with reference to the attached drawings.

Figure 1:
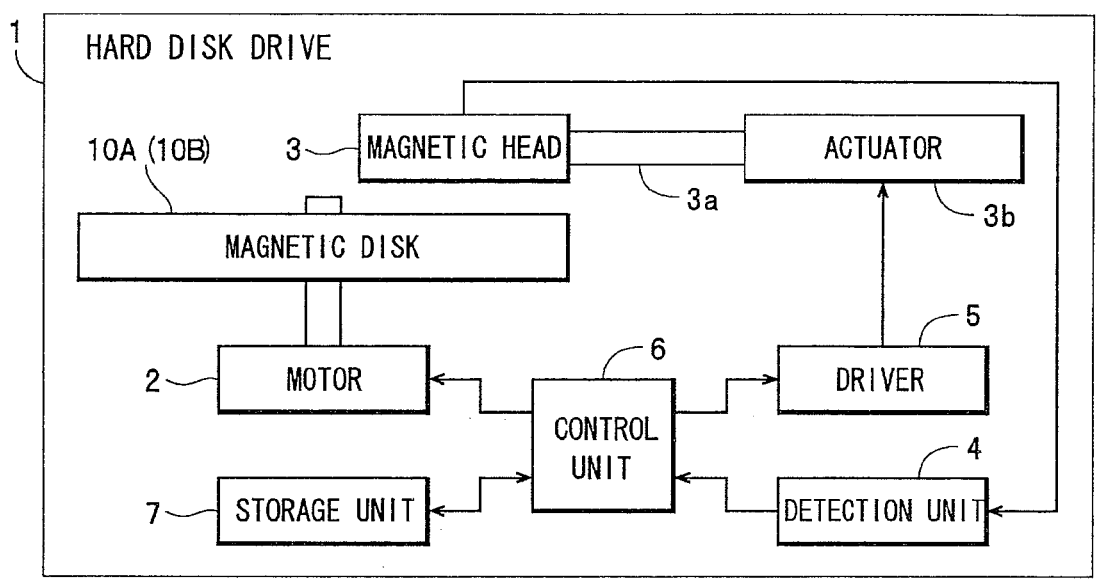
FIG. 1 is a diagram showing the construction of a hard disk drive.

The hard disk drive 1 shown in FIG. 1 is one example of a recording/reproducing apparatus according to the present invention, includes a motor 2, a magnetic head 3, a detection unit 4, a driver 5, a control unit 6, a storage unit 7, and a magnetic disk 10A, and is capable of recording and reproducing various kinds of data. The motor 2 rotates the magnetic disk 10A at a fixed rotational speed, such as 4200 rpm, under the control of the control unit 6. The magnetic head 3 is attached to an actuator 3b via a swing arm 3a and is moved above the magnetic disk 10A during the recording and reproducing of recording data on the magnetic disk 10A by the actuator 3b. Also, the magnetic head 3 carries out reads of servo data from servo pattern regions Asa (see FIG. 4) of the magnetic disk 10A, magnetic writes of recording data in data recording regions At (see FIG. 4), and reads of recording data that has been magnetically written in the data recording regions At. It should be noted that although the magnetic head 3 is actually constructed by forming a reproducing element Ra (see FIG. 5) and a recording element (not shown) on a base surface (air bearing surface) of a slider that causes the magnetic head 3 to fly above the magnetic disk 10A, the slider and the recording element have been omitted from this specification and the drawings. Here, the width Wr in the width direction (a direction corresponding to the radial direction of the magnetic disk 10A) of a surface of the reproducing element Ra that faces the magnetic disk 10A is set so as to satisfy a predetermined condition described later. The actuator 3b swings the swing arm 3a by a driving current supplied from the driver 5 under the control of the control unit 6 and thereby moves the magnetic head 3 to an arbitrary recording/reproducing position (an arbitrary track) above the magnetic disk 10A.

The detection unit 4 obtains (detects) servo data from the output signal outputted from the magnetic head 3 and outputs the servo data to the control unit 6. The driver 5 controls the actuator 3b in accordance with a control signal outputted from the control unit 6 so that the magnetic head 3 is made on-track to a desired track. The control unit 6 carries out overall control of the hard disk drive 1. The control unit 6 is one example of a "control unit" for the present invention, and controls the driver 5 based on a burst signal out of the servo data (one example of a "control signal read via the magnetic head") outputted from the detection unit 4 (i.e., the control unit 6 executes a tracking servo control process). The storage unit 7 stores an operation program of the control unit 6 and the like.

Figure 2:
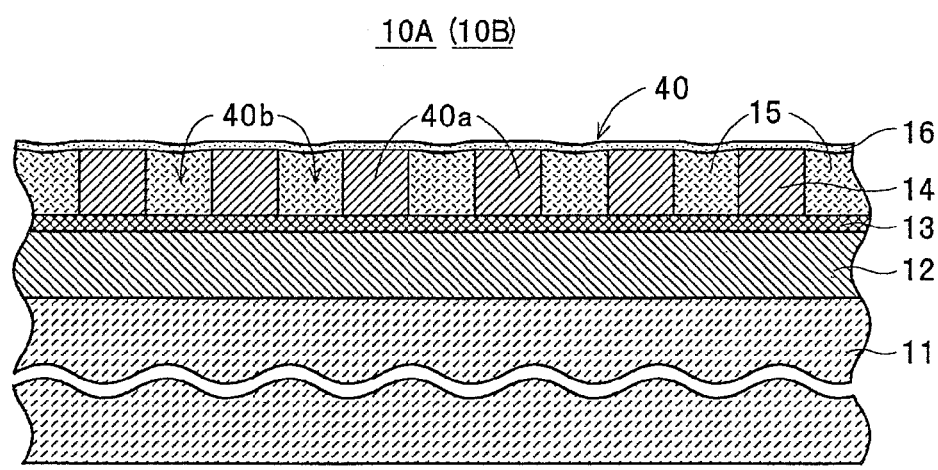
FIG. 2 is a cross-sectional view showing the layer construction of the magnetic disk shown in FIG. 1.

On the other hand, the magnetic disk 10A is one example of a "magnetic recording medium" for the present invention and is disposed together with the above-described motor 2, the magnetic head 3, and the like inside a housing of the hard disk drive 1. The magnetic disk 10A is a discrete track-type magnetic disk (patterned medium) on which recording data can be recorded by a perpendicular recording method, and as shown in FIG. 2 is constructed so that a soft magnetic layer 12, an intermediate layer 13, and a magnetic layer 14 are formed in the mentioned order on a glass substrate 11. Here, the magnetic layer 14 constructs concave/convex patterns 40 constructed of convex parts 40a, which are entirely formed of a magnetic material from protruding end parts (the surface side of the magnetic disk 10A: the upper end parts in FIG. 2) to base end parts (lower end parts in FIG. 2) thereof, and concave parts 40b, which are formed in between the convex parts 40a. The concave parts 40b are filled with a non-magnetic material 15 such as $SiO_2$ to make the surface of the magnetic disk 10A flat. Note that on the magnetic disk 10A, the formation regions of the convex parts 40a correspond to "recording regions", and the formation regions of the concave parts 40b (the regions filled with the non-magnetic material 15) correspond to "non-recording regions". In addition, a protective layer 16 (DLC film) of diamond-like carbon (DLC) or the like with a thickness of around 2 nm is formed on the surfaces of the non-magnetic material 15 that fills the concave parts 40b and the magnetic layer 14 (the convex parts 40a). A lubricant (as one example, a Fomblin lubricant) is also applied onto the surface of the protective layer 16 to protect both the magnetic head 3 and the magnetic disk 10A from damage.

The glass substrate 11 is formed in a disk shape with a thickness of around 0.6 mm by polishing the surface of a glass plate with a diameter of 2.5 inches. It should be noted that the substrate used for the magnetic disk 10A is not limited to a substrate of the glass material described above and it is possible to use a substrate formed in a disk shape using various types of non-magnetic materials such as aluminum or ceramics. The soft magnetic layer 12 is formed as a thin film with a thickness of around 100 nm to 200 nm by sputtering a soft magnetic material such as CoZrNb alloy. The intermediate layer 13 functions as an underlayer for forming the magnetic layer 14 and is formed as a thin film with a thickness of around 40 nm by sputtering an intermediate layer forming material such as Cr or a non-magnetic CoCr alloy. The magnetic layer 14 constructs the concave/convex patterns 40 (data track patterns 40t and servo patterns 40sa shown in FIG. 4), with the concave parts 40b being formed by carrying out an etching process on a layer formed by sputtering a CoCrPt alloy, for example.

Figure 3:
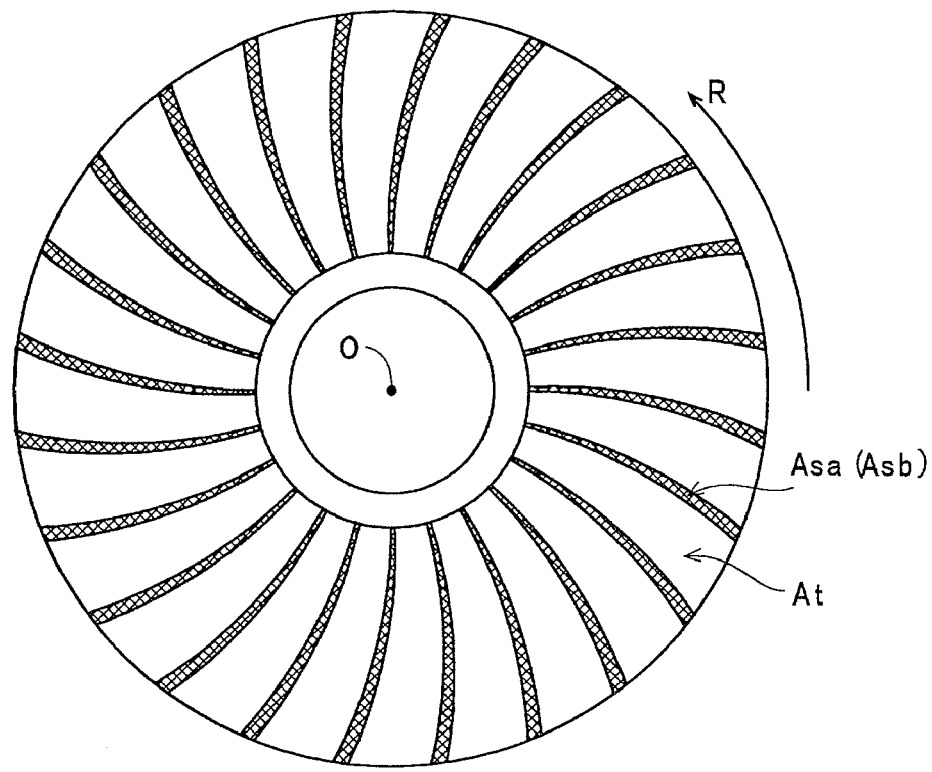
FIG. 3 is a plan view of the magnetic disk.

Here, as shown in FIG. 3, on the magnetic disk 10A, servo pattern regions Asa are provided between the respective data recording regions At, and the data recording regions At and the servo pattern regions Asa are set so as to be alternately disposed in a direction of rotation (the direction of the arrow R) of the magnetic disk 10A. The hard disk drive 1 equipped with the magnetic disk 10A is constructed as described above so that the motor 2 rotates the magnetic disk 10A at a constant angular velocity in accordance with control by the control unit 6. Accordingly, on the magnetic disk 10A, the length of the data recording regions At along the direction of rotation of the magnetic disk 10A and the length of the servo pattern regions Asa along the direction of rotation are set so as to increase as the distance from the center O increases in proportion to the length on the magnetic disk 10A that passes below the magnetic head 3 per unit time (i.e., the data recording regions At and the servo pattern regions Asa become wider from an inner periphery region toward an outer periphery region). As a result, the length along the direction of rotation of data recording tracks (the convex parts 40a)

formed inside the data recording regions At and the standard lengths along the direction of rotation of the convex parts 40a and concave parts 40b used as the servo patterns 40sa formed inside the servo pattern regions Asa (for example, the lengths corresponding to a one-bit signal) becomes longer from the inner periphery region to the outer periphery region of the magnetic disk 10A.

Figure 4:
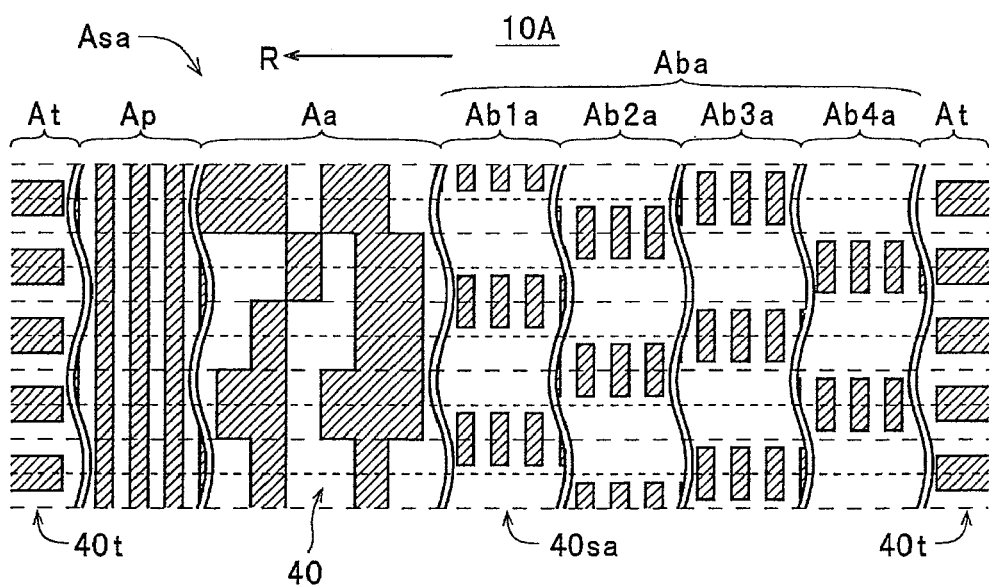
FIG. 4 is a plan view of the magnetic disk showing examples of various patterns formed in a servo pattern region.

Also, as shown in FIG. 4, data track patterns 40t are formed in the data recording regions At. Note that in FIG. 4 and in FIGS. 5, 16, and 17 described later, the obliquely shaded regions show the formation regions of the convex parts 40a (that is, the recording regions) in the concave/convex patterns 40, while the white regions show the formation regions of the concave parts 40b (that is, the non-recording regions) of the concave/convex patterns 40. Here, as shown in FIG. 5, each data track pattern 40t is constructed of a large number of concentric or spiral convex parts 40a (data recording tracks) centered on the center O (see FIG. 3) and concave parts 40b present between the respective convex parts 40a ("inter-track concave parts"). Note that although it is preferable for the center of rotation of the magnetic disk 10A and the center O ("track pattern center" for the present invention) of the data track patterns 40t to match, in reality there is the risk of a minute displacement of around 30 µm to 50 µm being caused between the center of rotation of the magnetic disk 10A and the center O of the data track patterns 40t due to manufacturing error. However, since tracking servo control can still be performed sufficiently for the magnetic head 3 when a displacement of such magnitude is present, the center of rotation and the center O can be thought of as effectively matching. Also, in each data recording region At of the magnetic disk 10A, as one example, the length of the convex parts 40a (the data recording tracks) along the radial direction of the magnetic disk 10A is equal to the length of the concave parts 40b along the radial direction of the magnetic disk 10A. That is, the ratio of the widths is 1:1. In addition, on the magnetic disk 10A, the length along the radial direction of the convex parts 40a formed in the data recording regions At and the length along the radial direction of the concave parts 40b are set substantially equal from the inner periphery region to the outer periphery region of the magnetic disk 10A.

On the other hand, as shown in FIG. 4, a servo pattern 40sa, which includes a preamble pattern formed by a concave/convex pattern 40 in a preamble pattern region Ap, an address pattern formed by a concave/convex pattern 40 in an address pattern region Aa, and burst patterns formed by concave/convex patterns 40 in the burst pattern region Aba, is formed in each servo pattern region Asa. The burst pattern region Aba includes four burst regions, a first burst region Ab1a to a fourth burst region Ab4a. In this case, patterns for positional detection to make the magnetic head 3 on-track to a desired track are formed by concave/convex patterns 40 in the first burst region Ab1a to the fourth burst region Ab4a in the burst pattern region Aba. More specifically, as shown in FIG. 5, by forming a plurality of convex parts 40a (recording regions) along the direction of rotation of the magnetic disk 10A (the direction of the arrow R), regions in which convex parts 40a and concave parts 40b (non-recording regions) are alternately disposed along the direction of rotation and regions where concave parts 40b are continuous along the direction of rotation are formed.

Also, as shown in FIG. 5, two sets of burst patterns BP1a, BP2a corresponding to "M sets of burst patterns" for the present invention are formed in the burst pattern region Aba (an example where "M=2"). More specifically, a burst pattern BP1a corresponding to one out of the "M sets of burst patterns" for the present invention is formed by the concave/convex pattern 40 formed in the first burst region Ab1a and the concave/convex pattern 40 formed in the second burst region Ab2a and a burst pattern BP2a corresponding to another out of the "M sets of burst patterns" for the present invention is formed by the concave/convex pattern 40 formed in the third burst region Ab3a and the concave/convex pattern 40 formed in the fourth burst region Ab4a. Also, the convex parts 40a formed in each burst pattern region Aba respectively correspond to "burst signal units" for the present invention and are formed so as to have equal lengths L11 (referred to as "BW" for the present invention) along the radial direction of the magnetic disk 10A (the left-right direction in FIG. 5). Note that although an example where three convex parts 40a are disposed along the direction of rotation in each of the burst regions from the first burst region Ab1a to the fourth burst region Ab4a has been illustrated for ease of understanding the present invention, in reality ten to thirty convex parts 40a are formed in a line along the direction of rotation in each burst region. In addition, the pattern formed in each burst region is not limited to a pattern where a plurality of burst signal units are disposed along the direction of rotation, and it is possible to construct a burst pattern by forming a single burst signal unit (a convex part 40a) along the direction of rotation in each burst region.

Here, on the magnetic disk 10A, a plurality of burst patterns BP1a are formed along the radial direction inside the first burst region Ab1a and the second burst region Ab2a and a plurality of burst patterns BP2a are formed along the radial direction inside the third burst region Ab3a and the fourth burst region Ab4a. The rows of convex parts 40a disposed along the direction of rotation inside the burst regions Ab1a to Ab4a each construct two burst patterns BP1a (or two burst patterns BP2a). More specifically, as shown in FIG. 5, as one example, a row of convex parts 40a disposed along the direction of rotation inside the first burst region Ab1a constructs one burst pattern BP1a together with a row of convex parts 40a inside the second burst region Ab2a positioned closer to the inner periphery in the radial direction than such a row of convex parts 40a and another burst pattern BP1a together with a row of convex parts 40a inside the second burst region Ab2a positioned closer to the outer periphery than such a row of convex parts 40a.

Also, as shown in FIG. 5, on the magnetic disk 10A, the concave/convex patterns 40 are formed in each burst pattern region Aba to form the burst patterns BP1a, BP2a so that the distance from the center O to the burst signal units (as one example, the distance between the center O and centers in the radial direction of the burst signal units (the convex parts 40a)) differs in each burst region from the first burst region Ab1a to the fourth burst region Ab4a. Here, regarding the burst pattern BP1a, the convex parts 40a formed in the first burst region Ab1a and the second burst region Ab2a correspond to "two types of burst signal units" for the present invention and regarding the burst pattern BP2a, the convex parts 40a formed in the third burst region Ab3a and the fourth burst region Ab4a correspond to "two types of burst signal units" for the present invention. In addition, on the magnetic disk 10A, the concave/convex patterns 40 are formed in each burst pattern region Aba so that the formation pitch along the radial direction of the convex parts 40a in each burst region out of the first burst region Ab1a to the fourth burst region Ab4a (a length equal to the distance between the centers in the radial direction of the convex parts 40a in each burst region: the length L12 in FIG. 5) is equal. Here, on the magnetic disk 10A, the length L12 is double the track pitch Tp (an example where "N=2" for "(2·M/N)·Track Pitch").

Also, on the magnetic disk 10A, the convex parts 40a are formed in the first burst region Ab1a to the fourth burst region Ab4a so that four (one example of "2·M") centers C1a, C2a, ... in the radial direction of the burst patterns BP1a, BP2a, ... are present at intervals equal to half the track pitch Tp (i.e., "(1/N)·Track Pitch") in a range whose length L10 along the radial direction is produced by multiplying the track pitch Tp by (2·M/N) (i.e., "(2·M/N)·Track Pitch": in this example, a length double the track pitch) where both ends of the length L10 in the radial direction (positions shown by the dot-dash lines in FIG. 5) do not match the centers C1a, C2a, ... in the radial direction of the burst patterns BP1a, BP2a, ... (such range is referred to as a "predetermined range" for the present invention). On the magnetic disk 10A, the concave/convex patterns 40 are formed in each burst pattern region Aba so that the center C1a in the radial direction of a burst pattern BP1a matches a center (track center) in the radial direction of a data recording track (convex parts 40a formed in the data recording regions At) (i.e., the distance between the center C1a of a burst pattern BP1a and the center of a data recording track is "0") and the distance (length L15) between the center C2a in the radial direction of a burst pattern BP2a and the center in the radial direction of a data recording track is half the track pitch Tp.

The burst patterns BP1a are formed so that the convex parts 40a formed in the first burst region Ab1a and the convex parts 40a formed in the second burst region Ab2a are separated from each other in the direction of rotation via concave parts 40b (one example where the burst patterns BP1a are formed so that "a first type of burst signal units and a second type of burst signal units out of the two types of burst signal units do not overlap in the direction of rotation"). In addition, in the burst patterns BP1a, the centers in the radial direction of the convex-parts 40a formed in the first burst region Ab1a and the centers in the radial direction of the convex parts 40a formed in the second burst region Ab2a are separated in the radial direction by a length L13 equal to the track pitch Tp ("(M/N) ·Track Pitch" for the present invention). In the burst patterns BP1a, facing end parts out of the end parts in the radial direction of the convex parts 40a formed in the first burst region Ab1a and the convex parts 40a formed in the second burst region Ab2a are separated in the radial direction via concave parts 40b by a length L14 that is narrower than the track pitch Tp ("(M/N)·Track Pitch"). On the magnetic recording medium according to the present invention, it is not necessary to separate the convex parts 40a in the first burst region Ab1a and the convex parts 40a in the second burst region Ab2a by the length L14 in the radial direction in the entire range from the inner periphery region to the outer periphery region, and it is possible to use a construction where the convex parts 40a are separated in the radial direction in only an arbitrary region. It is also possible for the length L14 to differ as desired in respective regions from the inner periphery region to the outer periphery region without the length L14 being set at the same length from the inner periphery region to the outer periphery region. Since the sensitivity of the PES increases as the length L14 increases, if there is the risk of the PES sensitivity being insufficient in the inner periphery, for example, it is possible to use a construction where the length L14 gradually increases on the magnetic disk 10A from the outer periphery to the inner periphery.

The burst patterns BP2a are formed so that the convex parts 40a formed in the third burst region Ab3a and the convex parts 40a formed in the fourth burst region Ab4a are separated from each other in the direction of rotation via concave parts 40b (one example where the burst patterns BP2a are formed so that "a first type of burst signal units and a second type of burst signal units out of the two types of burst signal units do not overlap in the direction of rotation"). In addition, in the burst patterns BP2a, the centers in the radial direction of the convex parts 40a formed in the third burst region Ab3a and the centers in the radial direction of the convex parts 40a formed in the fourth burst region Ab4a are separated in the radial direction by the length L13 equal to the track pitch Tp ("(M/N)·Track Pitch" for the present invention). In the burst patterns BP2a, facing end parts out of the end parts in the radial direction of the convex parts 40a formed in the third burst region Ab3a and the convex parts 40a formed in the fourth burst region Ab4a are separated in the radial direction via concave parts 40b by the length L14 that is narrower than the track pitch Tp ("(M/N)·Track Pitch").

On the magnetic recording medium according to the present invention, it is not necessary to separate the convex parts 40a in the third burst region Ab3a and the convex parts 40a in the fourth burst region Ab4a by the length L14 in the radial direction in the entire range from the inner periphery region to the outer periphery region, and it is possible to use a construction where the convex parts 40a are separated in the radial direction in only an arbitrary region. It is also possible for the length L14 to differ as desired in respective regions from the inner periphery region to the outer periphery region without the length L14 being set at the same length from the inner periphery region to the outer periphery region. Since the sensitivity of the PES increases as the length L14 increases, if there is the risk of the PES sensitivity being insufficient in the inner periphery region, for example, it is possible to use a construction where the length L14 gradually increases on the magnetic disk 10A from the outer periphery to the inner periphery. Note that to carry out the recording and reproducing of recording data properly, the actuator 3b described above (as one example, a VCM (Voice Coil Motor)) is normally designed so that the tracking precision (mechanical precision) is 5% or below of the track pitch Tp. In other words, during the recording and reproducing of recording data, the magnetic head 3 driven by the actuator 3b constantly makes minute movements in the radial direction of the magnetic disk 10A in a predetermined range with an upper limit of around 5% of the track pitch Tp. Accordingly, to reliably improve the sensitivity of the PES, the length L14 (the distance in the radial direction between the two types of burst signal units that construct a burst pattern) in the burst patterns BP1a, BP2a described above should preferably be set at least 5% of the track pitch Tp.

The above magnetic disk 10A is formed as described above so that both "M" and "N" for the present invention are "2". Accordingly, if the values of "M=2" and "N=2" are substituted into a condition "(M+1)·Tp/N−BW≦Wr≦(M−1)·Tp/N+BW" to be satisfied by the magnetic recording medium according to the present invention, the magnetic disk 10A will satisfy the above condition so long as the width Wr of the reproducing element Ra of the magnetic head 3 is equal to or greater than a width Wr1a (see FIG. 5) that is "3/2 times the track pitch Tp minus the length L11" and equal to or less than a width Wr2a (see FIG. 5) that is "1/2 times the track pitch Tp plus the length L11". In the present specification, the case where the width Wr of the reproducing element Ra of the magnetic head 3 is "3/2 times the track pitch Tp minus the length L11" is described below as one example. Note that the width (the minimum width Wr1a and the maximum width Wr2a) of the reproducing element Ra of the magnetic head 3 when using the magnetic disk 10A will be described in detail later.

Next, the method of manufacturing the magnetic disk 10A will be described.

Figure 6:
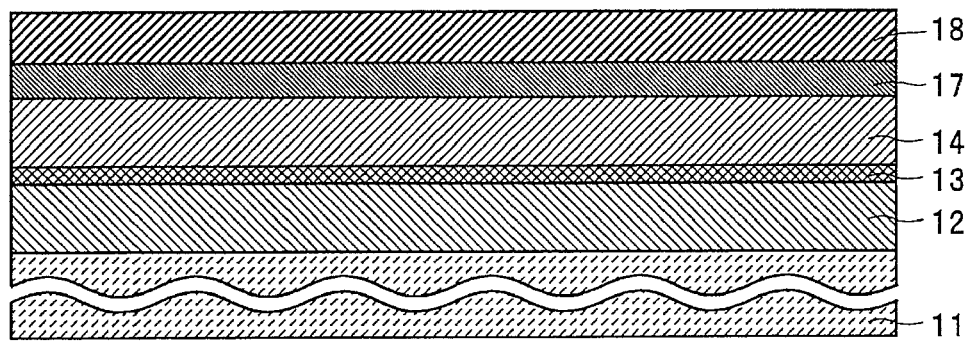
FIG. 6 is a cross-sectional view showing the layer construction of a preform.
Figure 7:
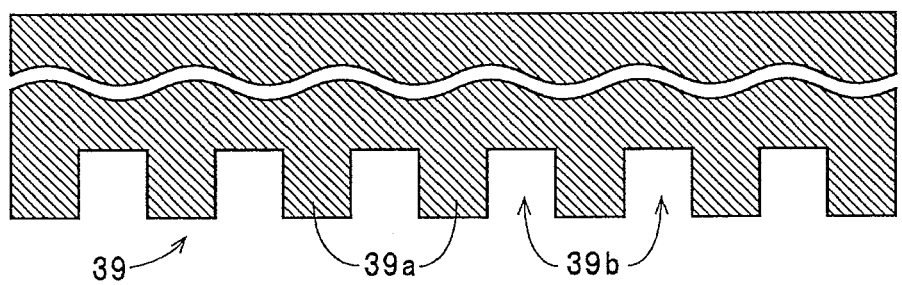
FIG. 7 is a cross-sectional view of a stamper.

When manufacturing the magnetic disk 10A described above, a preform 20 shown in FIG. 6 and a stamper 30 shown in FIG. 7 are used. Here, as shown in FIG. 6, the preform 20 is constructed by forming the soft magnetic layer 12, the intermediate layer 13, and the magnetic layer 14 in the mentioned order on the glass substrate 11, with a mask layer 17 and a resin layer (resist layer) 18 with a thickness of around 80 nm being formed on the magnetic layer 14. On the other hand, the stamper 30 is one example of a "stamper for manufacturing a magnetic recording medium" according to the present invention and as shown in FIG. 7 has formed thereupon a concave/convex pattern 39 capable of forming a concave/convex pattern 41 for forming the concave/convex patterns 40 (the data track patterns 40t and the servo patterns 40sa) of the magnetic disk 10A so that the magnetic disk 10A can be manufactured by imprinting. In this case, the concave/convex pattern 39 of the stamper 30 is formed so that convex parts 39a correspond to the concave parts 40b (non-recording regions as "one of the regions" for the present invention) in the concave/convex patterns 40 and concave parts 39b correspond to the convex parts 40a (recording regions as "other" of the regions" for the present invention) in the concave/convex patterns 40 of the magnetic disk 10A. Note that since it is possible to manufacture the stamper 30 using a variety of well-known manufacturing methods, detailed description of the method of manufacturing the stamper 30 has been omitted.

Figure 8:
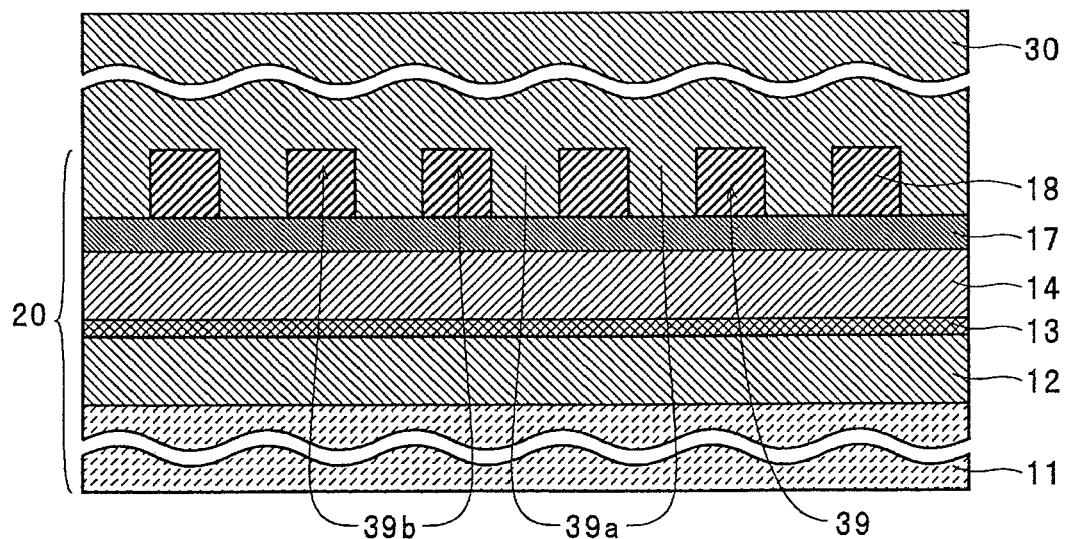
FIG. 8 is a cross-sectional view of a state where a concave/convex pattern of a stamper has been pressed into a resin layer of the preform.
Figure 9:
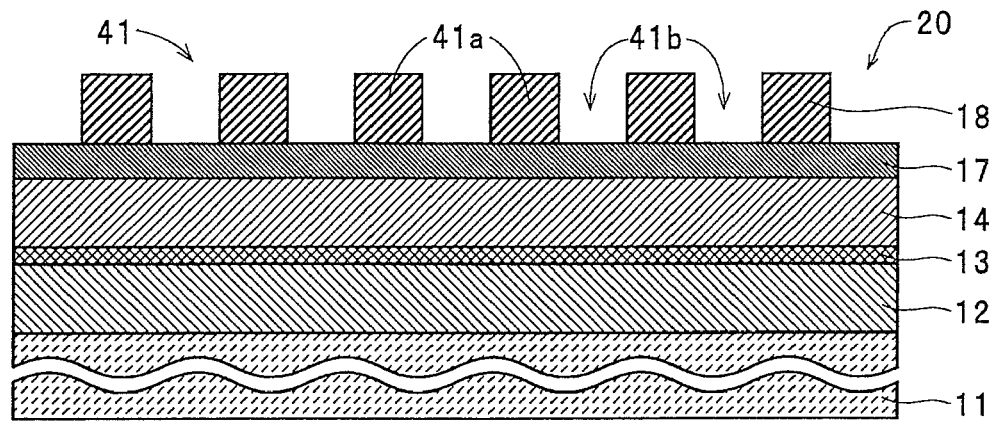
FIG. 9 is a cross-sectional view of a state where a concave/convex pattern (a resin mask) has been formed on a mask layer by separating a stamper from the resin layer in the state shown in FIG. 8.

First, as shown in FIG. 8, the concave/convex pattern 39 of the stamper 30 is transferred to the resin layer 18 of the preform 20 by imprinting. More specifically, by pressing the surface of the stamper 30 on which the concave/convex pattern 39 is formed onto the resin layer 18 of the preform 20, the convex parts 39a of the concave/convex pattern 39 are pressed into the resin layer 18 of the preform 20. When doing so, the resist (resin layer 18) at positions where the convex parts 39a are pressed in moves inside the concave parts 39b of the concave/convex pattern 39. After doing so, the stamper 30 is separated from the preform 20 and by carrying out an oxygen plasma process to remove resin (not shown) remaining on the base surfaces, as shown in FIG. 9, a concave/convex pattern 41 composed of the resin layer 18 is formed on the mask layer 17 of the preform 20. Here, the height of the respective convex parts 41a in the concave/convex pattern 41 (or the depth of the respective concave parts 41b) is around 130 nm.

Figure 10:
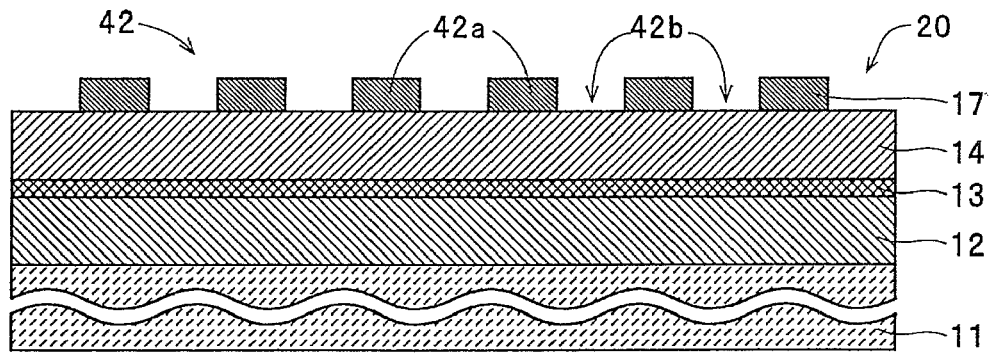
FIG. 10 is a cross-sectional view of a state where a concave/convex pattern (mask) has been formed on a magnetic layer by etching the mask layer with the concave/convex pattern as a mask.
Figure 11:
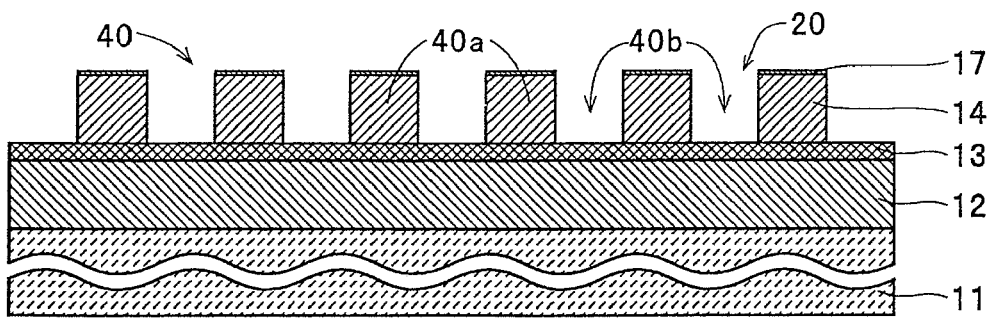
FIG. 11 is a cross-sectional view of a state where a concave/convex pattern has been formed on an intermediate layer by etching the magnetic layer with the concave/convex pattern as a mask.

Next, by carrying out an etching process using the concave/convex pattern 41 (the resin layer 18) described above as a mask, the mask layer 17 exposed from the mask (the convex parts 41a) at the base parts of the concave parts 41b in the concave/convex pattern 41 is etched as shown in FIG. 10 to form a concave/convex pattern 42 including convex parts 42a and concave parts 42b in the mask layer 17 of the preform 20. After this, by carrying out an etching process with the concave/convex pattern 42 (the mask layer 17) as a mask, the magnetic layer 14 exposed from the mask (the convex parts 42a) at the base parts of the concave parts 42b of the concave/convex pattern 42 is etched as shown in FIG. 11 to form the concave/convex patterns 40 including the convex parts 40a and the concave parts 40b in the magnetic layer 14 of the preform 20. Next, by carrying out a selective etching process on the mask layer 17 remaining on the convex parts 40a, the remaining mask layer 17 is completely removed to expose the protruding end surfaces of the convex parts 40a. By doing so, the data track patterns 40t and the servo patterns 40sa (the concave/convex patterns 40) are formed on the intermediate layer 13.

Next, as shown in FIG. 12, $SiO_2$ is sputtered as the non-magnetic material 15. When doing so, a sufficient amount of non-magnetic material 15 is sputtered to completely fill the concave parts 40b with the non-magnetic material 15 and to form a layer of the non-magnetic material 15 with a thickness of around 60 nm, for example, on the convex parts 40a. After this, ion beam etching is carried out on the layer of the non-magnetic material 15 on the magnetic layer 14 (on the convex parts 40a and on the concave parts 40b). When doing so, the ion beam etching continues until the protruding end surfaces of the convex parts 40a are exposed from the non-magnetic material 15. By doing so, the ion beam etching is completed on the layer of the non-magnetic material 15 as shown in FIG. 13 to make the surface of the preform 20 flat. Next, after the protective layer 16 has been formed by forming a thin film of diamond-like carbon (DLC) by CVD so as to cover the surface of the preform 20, a Fomblin lubricant is applied to the surface of the protective layer 16 with an average thickness of around 2 nm, for example. By doing so, as shown in FIG. 2, the magnetic disk 10A is completed.

Figure 14:
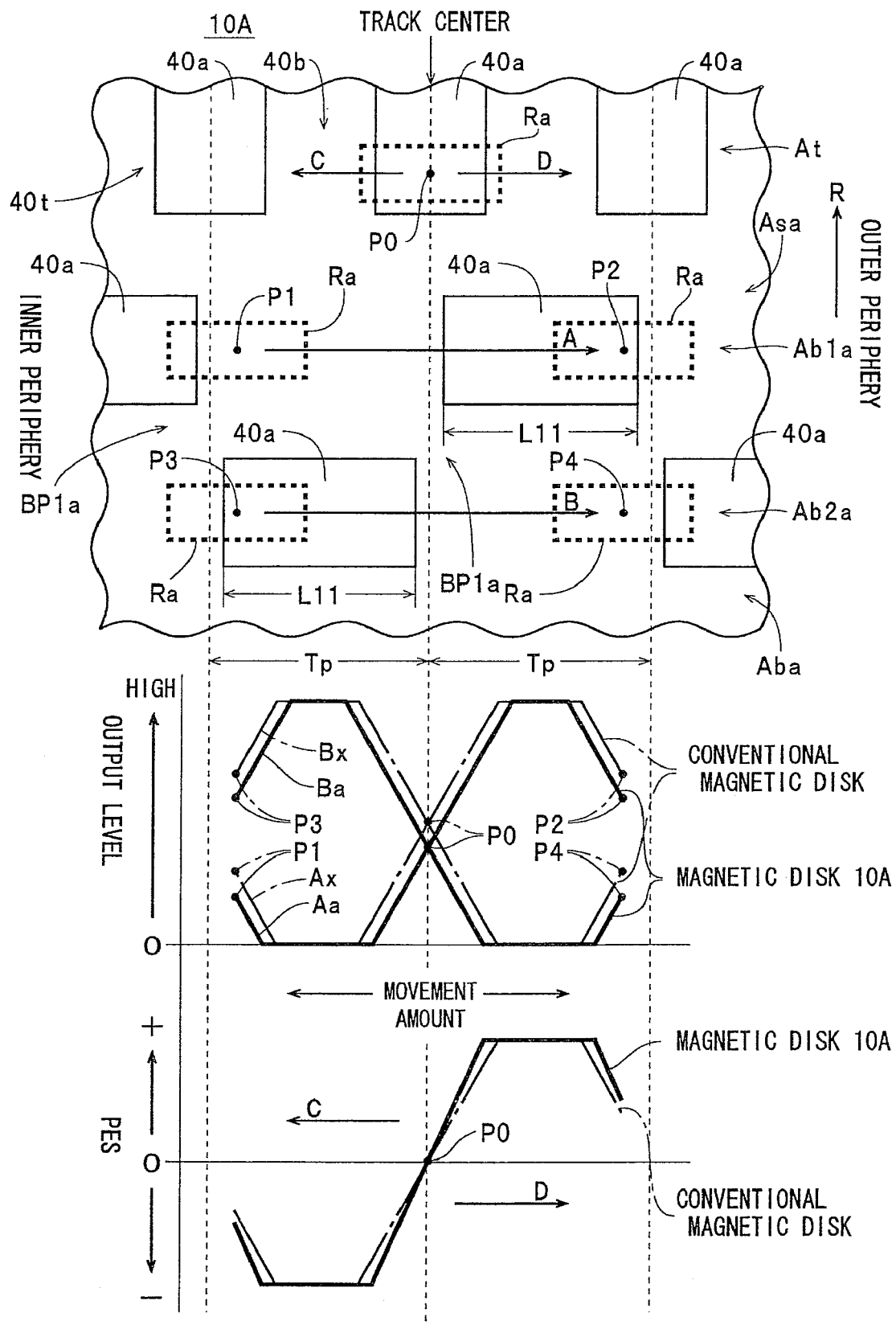
FIG. 14 is a diagram useful in explaining the relationship between (i) positions (movement amounts) of a reproducing element on the magnetic disk and (ii) an output level of an output signal from a magnetic head and a PES.

As shown in FIG. 14, as one example, the burst patterns BP1a are formed on the magnetic disk 10A so that the end parts in the radial direction of the convex parts 40a formed in the first burst region Ab1a and the end parts in the radial direction of the convex parts 40a formed in the second burst region Ab2a are separated and do not overlap one another in the radial direction on both sides of track centers (the centers of data recording tracks in the radial direction). Accordingly, on the magnetic disk 10A, the length L11 along the radial direction of the convex parts 40a (burst signal units) formed in the burst regions Ab1a, Ab2a is shorter than the track pitch Tp. As a result, when the position of the magnetic head 3 relative to the magnetic disk 10A changes and the magnetic head 3 (the reproducing element Ra) moves with respect to the magnetic disk 10A in the direction of the arrow A from the position P1 to the position P2, for example, the output level of the output signal from the magnetic head 3 in the first burst region Ab1a is shown by the solid line Aa. Also, when the magnetic head 3 moves with respect to the magnetic disk 10A in the direction of the arrow B from the position P3 to the position P4, for example, the output level of the output signal from the magnetic head 3 in the second burst region Ab2a is shown by the solid line Ba. In this case, if the output signal shown by the solid line Aa is set as S1 and the output signal shown by the solid line Ba is set as S2, the PES obtained from the burst pattern BP1a is "(S1−S2)/(S1+S2)". Accordingly, the PES obtained from the burst pattern BP1a has the characteristics shown by the solid line in FIG. 14.

On the other hand, on the conventional magnetic disk 10x1, as described earlier, the burst patterns are formed so that both end parts in the radial direction of the servo patterns Ps1, Ps2 match the track centers, that is, both end parts are positioned at the track centers. Accordingly, on the conventional magnetic disk 10x1, the width Ts along the radial direction of the servo patterns Ps1, Ps2 (burst signal units) is equal to the track pitch Tp. As a result, when the position of the magnetic head with respect to the conventional magnetic disk 10x1 changes and the magnetic head (the reproducing element Rx) moves relative to the magnetic disk 10x1 in the direction of the arrow A from the position P1 to the position P2, for example, the output level of the output signal from the magnetic head is shown by the dot-dash line Ax. Also, when the magnetic head moves relative to the magnetic disk 10x1 in the direction of the arrow B from the position P3 to the position P4, for example, the output level of the output signal from the magnetic head is shown by the dot-dash line Bx. As a result, the PES obtained from the servo patterns Ps1, Ps2 of the conventional magnetic disk 10x1 has the characteristics shown by the dot-dash line in FIG. 14. In this case, when the magnetic head 3 moves in the directions of the arrows C, D from a state where the magnetic head 3 is positioned at the position P0 (in this example, the track center), although the amount of change in the PES relative to the movement amount of the magnetic head 3 is sufficiently large with the magnetic disk 10A, the amount of change in the PES relative to the movement amount of the magnetic head is smaller with the magnetic disk 10x1 than with the magnetic disk 10A. Accordingly, with the magnetic disk 10A, even when the magnetic head 3 is displaced from the track center by only a minute amount, it is possible to detect such displacement based on the PES.

On the magnetic disk 10A, as described above, the data track patterns 40t and the servo patterns 40sa are formed so that the width Wr of the magnetic head 3, the formation pitch (the track pitch Tp) along the radial direction of the convex parts 40a in the data track patterns 40t, and the length L11 ("BW" for the present invention) along the radial direction of the convex parts 40a formed in the first burst region Ab1a to the fourth burst region Ab4a satisfy the condition "(M+1)·Tp/N−BW≦Wr≦(M−1)·Tp/N+BW". Accordingly, with the magnetic disk 10A, the width Wr of the reproducing element Ra can be defined comparatively freely without the width Wr of the reproducing element Ra being primarily determined by the lengths of the various parts of the data track patterns 40t and the servo patterns 40sa. In other words, unlike the conventional magnetic disk 10x1, the lengths of the various parts of the data track patterns 40t and the servo patterns 40sa can be set without being primarily determined by the width Wr of the reproducing element Ra of the magnetic head 3.

Figure 15:
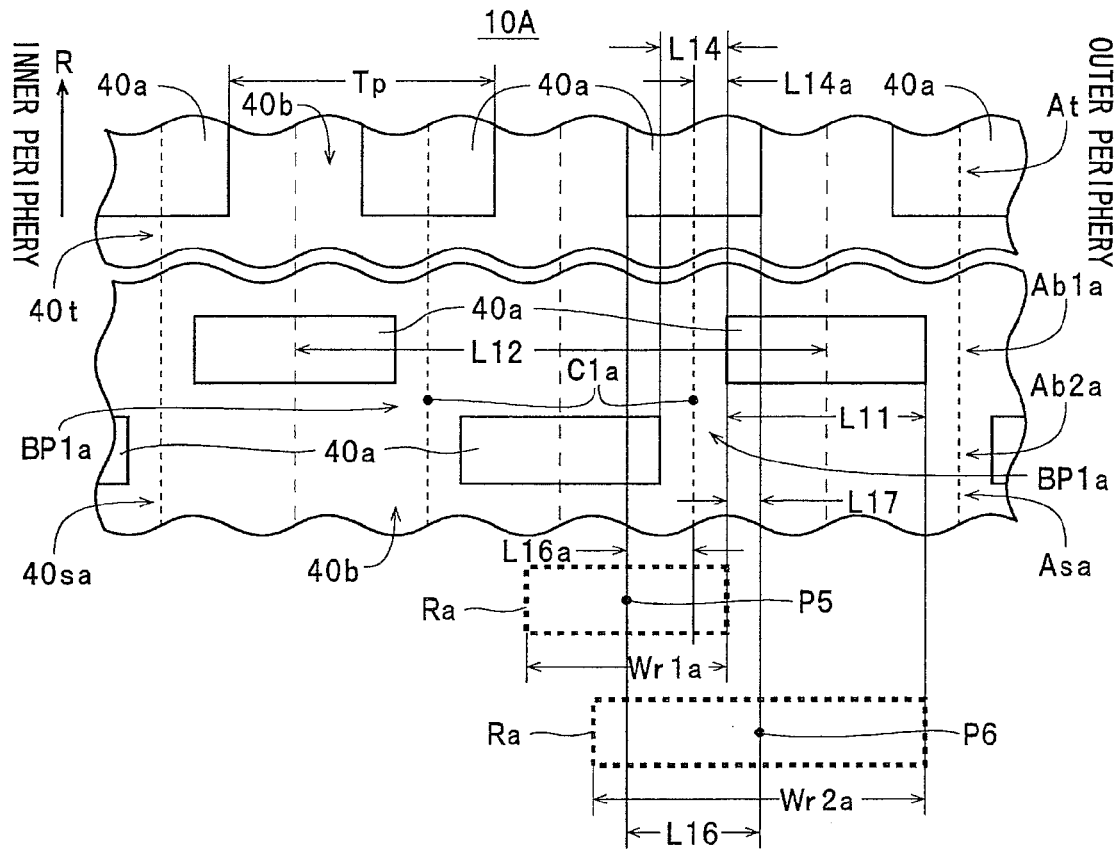
FIG. 15 is a diagram useful in explaining the relationship between the servo patterns on the magnetic disk and the width of the reproducing element.

More specifically, as shown in FIG. 15, on this magnetic disk 10A, the length L12 that is the formation pitch along the radial direction of the convex parts 40a formed in the first burst region Ab1a is double the track pitch Tp (i.e., "(M/N)·Tp·2"). In this case, the length L12 described above is equal to the length L10 (the length along the radial direction of the "predetermined range" for the present invention). This means that on the magnetic disk 10A, four (i.e., "2·M") centers C1a, C2a, . . . in the radial direction of the burst patterns BP1a, BP2a, . . . are present at intervals of half the track pitch Tp (intervals of "1/N·Track Pitch") within a range of the length L12. More specifically, the convex parts 40a (burst signal units) in the first burst region Ab1a to the fourth burst region Ab4a are formed so that the centers C1a, C2a, . . . of the burst patterns BP1a, BP2a, . . . are present near both ends of the convex parts 40a in the radial direction. Accordingly, in the first burst region Ab1a, for example, the centers C1a in the radial direction of two burst patterns BP1a are present in the range of the length L12 described above that is the formation pitch along the radial direction of the convex parts 40a. Also, the centers C1a, C2a in the radial direction of two sets (M sets) of burst patterns BP1a, BP2a, that is, a total of four (2·M) centers C1a, C2a, . . . are present in the range of the length L12.

Accordingly, on the magnetic disk 10A, a length L16 along the radial direction of the range in which tracking servo control is to be performed for the magnetic head 3 based on the PES obtained from one burst pattern BP1a, for example, is one quarter (1/(2·M)) of the length L12 described above. In this case, the length L16 is half the track pitch Tp ((M/N)·Tp·2/(2·M)=(1/N)·Tp), and on the magnetic disk 10A, half the track pitch Tp is the length L16 that is equal to the width of the data recording tracks and the width of the inter-track concave parts. That is, on the magnetic disk 10A, the range for which tracking servo control is to be carried out for the magnetic head 3 based on the PES obtained from the burst pattern BP1a is within the range of the length L16 that is equal to the width of the data recording tracks and the width of the inter-track concave parts. Also, the length L14 that is the distance along the radial direction between the end parts of the convex parts 40a formed in the first burst region Ab1a and the end parts of the convex parts 40a formed in the second burst region Ab2a is a length "(M/N)·Tp−BW" produced by subtracting the length L11 from half the length L12, and is equal to a length produced by subtracting the length L11 from the track pitch Tp.

Here, in a state where the reproducing element Ra is located at the position P5 that is one end part of the range (length L16) for which tracking servo control is to be carried out (i.e., in a state where the center in the width direction of the reproducing element Ra is above the position P5), if the width Wr of the reproducing element Ra is narrower than the width Wr1a in FIG. 15, a gap is produced in the radial direction (the direction of tracking servo control) between the end part of the reproducing element Ra and the end parts of the convex parts 40a formed in the first burst region Ab1a. Since this gap is a dead zone, the width Wr of the reproducing element Ra needs to be equal to or greater than the width Wr1a shown in FIG. 15. As shown in FIG. 15, the width Wr1a is double the total of the length L14a and the length L16a. Here, the length L14a is half of the length L14 and the length L16a is half of the length L16 (i.e., Tp/(2·N)). That is, half the width Wr1a is produced by subtracting half the length L11 from the total of (i) half the length (the length L14a: "(M/N)·Tp/2−BW/2") produced by subtracting the length L11 (the length L14) from the track pitch Tp and (ii) half the length (the length L16a: Tp/(2·N)) of half the track pitch Tp (the length L16), or in other words, by subtracting half the length L11 from ¾ of the track pitch Tp. Accordingly, the width Wr1a is a length produced by subtracting the length L11 (BW) from ½ times the track pitch Tp (i.e., (M+1)·Tp/N), which matches the term "(M+1)·Tp/N−BW" in the condition of the present invention.

On the other hand, in a state where the reproducing element Ra is located at the position P6 at another end part of the range for which tracking servo control is to be carried out (the length L16) (i.e., in a state where the center in the width direction of the reproducing element Ra is above the position P6), if the width Wr of the reproducing element Ra is wider than the width Wr2a shown in FIG. 15, the end part of the reproducing element Ra protrudes in the radial direction (the direction in which tracking servo control is carried out) from the end parts of the convex parts 40a formed in the first burst region Ab1a. Since the protruding amount is a dead zone, the width Wr of the reproducing element Ra needs to be equal to or below the width Wr2a shown in FIG. 15. The width Wr2a is double a length produced by subtracting the length L17 from the length L11. Here, the length L17 is a length produced by subtracting the length L14a from the length L16a, that is, a length produced by subtracting (Tp−BW)·(M/N)·(½), which is half a length produced by subtracting the length L11 from the track pitch Tp, from the length Tp/(2·N) that is half the length L16 (L16=half the track pitch Tp). That is, half the width Wr2a is a total ("BW−Tp/(2·N)+(M/N)·Tp/2−BW/2"="(M−1)·Tp/(2·N)+BW/2") of (i) a length produced by subtracting the length (Tp/(2·N) that is ¼ of the track pitch Tp from the length L11 and (ii) the length L14a. Accordingly, the width Wr2a is the total of the length (M−1)·Tp/N, which is half the track pitch Tp, and the length L11(BW), and therefore matches the "(M−1)·Tp/N+BW" term in the condition of the present invention.

As described above, the track pitch Tp and the length L11 on the magnetic disk 10A are set so as to satisfy the condition "(M+1)·Tp/N−BW≦Wr≦(M−1)·Tp/N+BW". Accordingly, for reproducing elements Ra of various widths Wr in a range from the width Wr1a to the width Wr2a set as described above, with the magnetic disk 10A, the position of the magnetic head 3 (the reproducing element Ra) above the magnetic disk 10A can be specified without producing dead zones. Here, with the magnetic disk 10A, the burst patterns BP1a, BP2a are formed in the burst pattern regions Aba so that the interval along the radial direction between the centers C1a, C2a, ... in the radial direction of the burst patterns BP1a, BP2a ... is (½)·track pitch Tp (an example where N=2 for "1/N·track pitch"). Accordingly, unlike the conventional magnetic disks 10x1, 10x2 where the burst patterns are formed so that intervals along the radial direction between the centers in the radial direction of the burst patterns produced by the servo patterns Ps1, Ps2 or the servo patterns Ps3, Ps4 functioning as a pair are equal to the track pitch Tp (where "N=1"), as described above, even if the width Wr of the reproducing element Ra is narrower than the track pitch Tp, it is still possible to specify the position of the magnetic head 3 (the reproducing element Ra) above the magnetic disk 10A without a dead zone being produced. This means that by using a reproducing element Ra whose width Wr is narrower than the track pitch Tp as necessary, it is possible to avoid "side reading".

Also, on the magnetic recording medium according to the present invention, the intervals between the centers in the radial direction of the burst patterns is set at "(1/N)·Track Pitch", where N is a natural number of two or higher. Here, when the value "N" is set at a non-natural number, the positional relationship in the radial direction between a track center of a data recording track and a position where the value of the PES obtained from a burst pattern is "0" (the position of a center in the radial direction of the burst pattern) will differ for each data recording track. As a result, the value of PES when the magnetic head (the reproducing element) is positioned at a track center will differ for each data recording track, for example, which makes a process complex to position the reproducing element at a track center of a desired data recording track based on the value of the PES. On the other hand, when the value "N" is a natural number, the positional relationship in the radial direction between a track center of a data recording track and a position where the value of the PES is "0" is the same for every data recording track. By doing so, since the value of the PES when the magnetic head (the reproducing element) is positioned at a track center is the same for every data recording track, for example, a process that positions the reproducing element at a track center based on the value of the PES can be carried out extremely easily for any of the recording tracks. Also, like the magnetic disk 10A described above, by having the centers C1a along the radial direction of the burst patterns BP1a match the track centers, it is possible to specify that the reproducing element Ra is positioned at a track center when the value of the PES is "0". By doing so, it is possible to easily position the reproducing element Ra on a track center without a complex process being necessary.

In this way, according to the magnetic disk 10A and the hard disk drive 1, by forming the burst signal units so that the M (in the above example, 2) sets of burst patterns BP1a, BP2a, . . . that each have two types of burst signal units constructed of convex parts 40a (recording regions) are formed in the direction of rotation, and so that in at least one part (in the above example, the entire region) out of the regions from the inner periphery region to the outer periphery region, facing end parts in the radial direction of the convex parts 40a formed in the first burst region Ab1a and the second burst region Ab2a are separated in the radial direction via the concave parts 40b (non-recording regions) and facing end parts in the radial direction of the convex parts 40a formed in the third burst region Ab3a and the fourth burst region Ab4a are separated in the radial direction via the concave parts 40b (non-recording regions), it is possible to sufficiently increase the amount by which the PES changes (i.e., the PES sensitivity) with respect to the amount by which the magnetic head 3 (the reproducing element Ra) moves relative to the magnetic disk 10A. As a result, even if the output signal from the magnetic head 3 becomes weaker due to an increase in track density, it is possible to reliably detect extremely small displacements and properly carry out tracking servo control. Also, unlike the conventional magnetic disk 10x1 where there is only one set of burst patterns (i.e., where M=1), there is no need for the width Wr of the reproducing element Ra of the magnetic head 3 to match the track pitch Tp, and therefore the data track patterns 40t and the servo patterns 40sb can be designed with increased freedom. Also, unlike the conventional magnetic disk 10x2 where there are two (M=2) burst patterns but the centers in the radial direction of the burst patterns are disposed at intervals equal to the track pitch, the width Wr of the reproducing element Ra does not need to be wider than the track pitch Tp, and therefore it is possible to sufficiently suppress "side reading".

According to the hard disk drive 1 equipped with the magnetic disk 10A, by forming the burst patterns BP1a, BP2a of the magnetic disk 10A so that the condition to be satisfied by the magnetic recording medium according to the present invention "(M+1)·Tp/N−BW≦Wr≦(M−1)·Tp/N+BW" is satisfied, it is possible to sufficiently increase the PES sensitivity by using a magnetic head 3 with a reproducing element Ra with a width Wr that satisfies the above condition without producing dead zones for the burst patterns, which makes it possible to carry out proper tracking servo control. Here, unlike the conventional magnetic disk 10x1, since the track pitch Tp and the length L11 along the radial direction of the burst signal units (the convex parts 40a) are not primarily determined by the width of the reproducing element Ra, the data track patterns and the servo patterns can be designed with increased freedom. By doing so, it is possible to suitably change the track pitch Tp and the length L11 along the radial direction of the burst signal units (the convex parts 40a) in accordance with objects such as increasing the track density and avoiding side reading. Also, unlike the conventional magnetic disk 10x2, the width Wr of the reproducing element Ra does not need to be made wider than the track pitch Tp, and therefore side reading can be sufficiently avoided. By doing so, it is possible to provide a hard disk drive 1 equipped with a magnetic disk 10A capable of high-density recording and not susceptible to reproducing errors.

In addition, according to the stamper 30 described above, by providing a concave/convex pattern 39 including convex parts 39a formed corresponding to the concave parts 40b (non-recording regions) of the concave/convex patterns 40 of the magnetic disk 10A and concave parts 39b formed corresponding to the convex parts 40a (recording regions) of the concave/convex patterns 40 of the magnetic disk 10A, it is possible to easily manufacture, using a method such as imprinting, a magnetic disk 10A with burst patterns BP1a, BP2a, . . . that can sufficiently increase the amount by which the PES changes (i.e., the PES sensitivity) with respect to the movement amount of the magnetic head 3 (the reproducing element Ra).

Next, an example where a magnetic disk 10B that is another example of a magnetic recording medium according to the present invention is provided in the hard disk drive 1 will be described with reference to the drawings. Note that component elements that are the same as the magnetic disk 10A described above have been assigned the same reference numerals and duplicated description thereof has been omitted.

Figure 16:
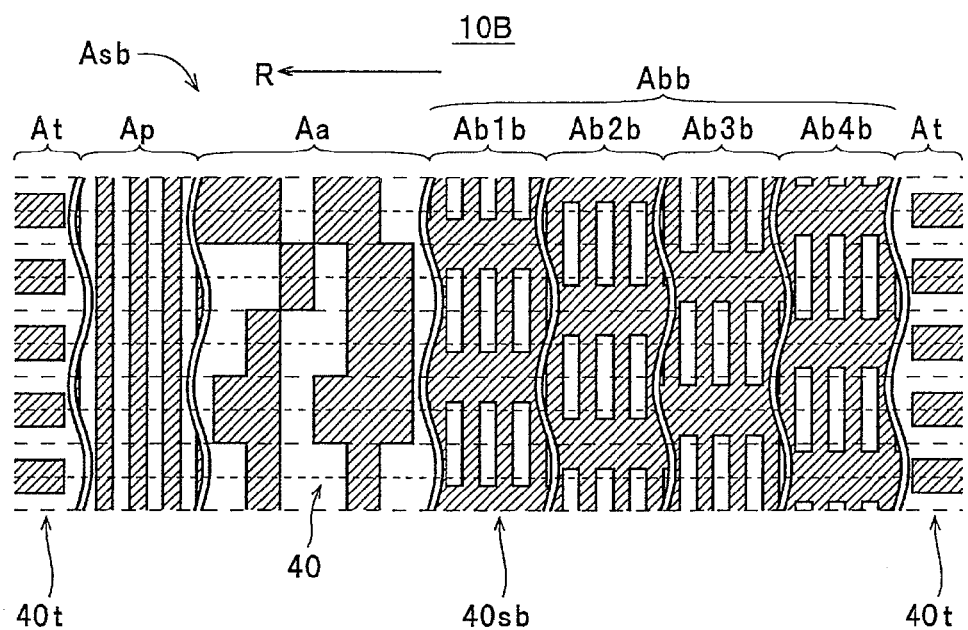
FIG. 16 is a plan view of a magnetic disk showing examples of various patterns formed in a servo pattern region.
Figure 17:
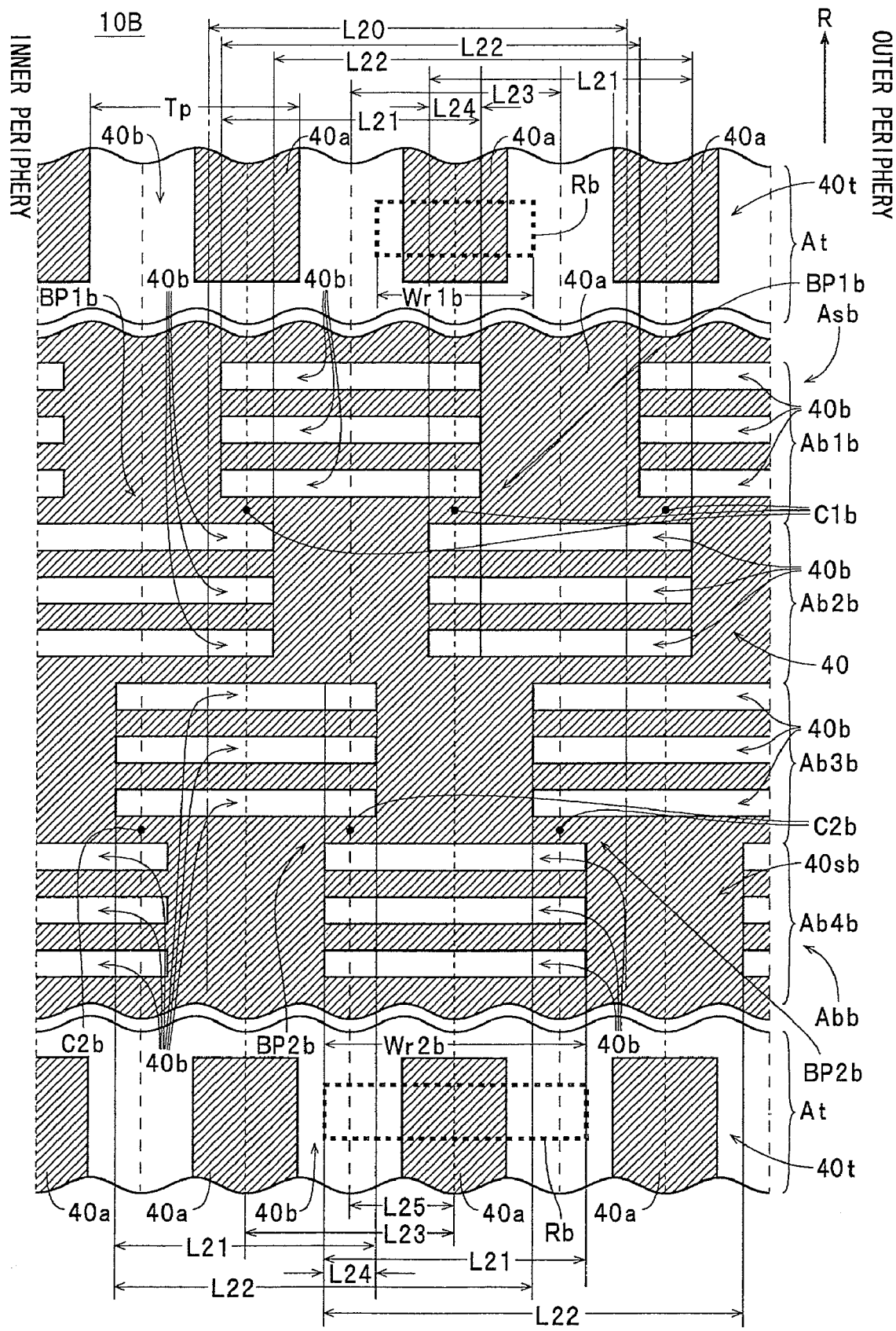
FIG. 17 is a plan view of a magnetic disk showing one example of the burst patterns formed in a first burst region to a fourth burst region in a burst pattern region.

As shown in FIG. 16, the magnetic disk 10B is constructed so that servo pattern regions Asb are set between the data recording regions At in place of the servo pattern regions Asa of the magnetic disk 10A. Here, in place of the burst pattern region Aba of the magnetic disk 10A, each servo pattern region Asb has a burst pattern region Abb including a first burst region Ab1b to the fourth burst region Ab4b. In the first burst region Ab1b to the fourth burst region Ab4b of the burst pattern region Abb, patterns for detecting the position of the magnetic head 3 to make the magnetic head 3 on-track to a desired track are formed by the concave/convex patterns 40. More specifically, as shown in FIG. 17, by forming a plurality of concave parts 40b along the direction of rotation (the direction of the arrow R) of the magnetic disk 10B, regions in which the concave parts 40b and the convex parts 40a are alternately disposed along the direction of rotation and regions in which the convex parts 40a are continuous in the direction of rotation are formed. Note that on the magnetic disk 10B, the formation regions of the convex parts 40a correspond to "recording regions" and the formation regions of the concave parts 40b (i.e., regions filled with the non-magnetic material 15) correspond to "non-recording regions".

Also, as shown in FIG. 17, two (an example where M=2) sets of burst patterns BP1b, BP2b that correspond to the "M burst patterns" for the present invention are formed in the burst pattern region Abb. More specifically, the burst pattern BP1b corresponding to one out of the M sets of burst patterns for the present invention is composed of the concave/convex pattern 40 formed in the first burst region Ab1b and the concave/convex pattern 40 formed in the second burst region Ab2b, and the burst pattern BP2b corresponding to another out of the M sets of burst patterns for the present invention is composed of the concave/convex pattern 40 formed in the third burst region Ab3b and the concave/convex pattern 40 formed in the fourth burst region Ab4b. The concave parts 40b formed in the burst pattern region Abb correspond to the "burst signal units" for the present invention and are formed so as to have an equal length L21 ("BW" for the present invention) along the radial direction (the left-right direction in FIG. 17) of the magnetic disk 10B. Note that in FIG. 17, although an example where three concave parts 40b are disposed along the direction of rotation in each of the burst regions from the first burst region Ab1b to the fourth burst region Ab4b has been illustrated for ease of understanding the present invention, in reality ten to thirty concave parts 40b are formed in a line along the direction of rotation in each burst region. In addition, the pattern formed in each burst region is not limited to a pattern where a plurality of burst signal units are disposed along the direction of rotation, and it is possible to construct a burst pattern by forming a single burst signal unit (a concave part 40b) along the direction of rotation in each burst region.

Here, on the magnetic disk 10B, a plurality of burst patterns BP1b are formed along the radial direction inside the first burst region Ab1b and the second burst region Ab2b and a plurality of burst patterns BP2b are formed along the radial direction inside the third burst region Ab3b and the fourth burst region Ab4b. The rows of concave parts 40b disposed along the direction of rotation inside the burst regions Ab1b to Ab4b each construct two burst patterns BP1b (or two burst patterns BP2b). More specifically, as shown in FIG. 17, as one example, a row of concave parts 40b disposed along the direction of rotation inside the first burst region Ab1b constructs one burst pattern BP1b together with a row of concave parts 40b inside the second burst region Ab2b positioned closer to the inner periphery in the radial direction than such a row of concave parts 40b and another burst pattern BP1b together with a row of concave parts 40b inside the second burst region Ab2b positioned closer to the outer periphery in the radial direction than such a row of concave parts 40b.

Also, as shown in FIG. 17, on the magnetic disk 10B, the concave/convex patterns 40 are formed in each burst pattern region Abb to form the burst patterns BP1b, BP2b so that the distance from the center O to the burst signal units (as one example, the distance between the center O and a center in the radial direction of the burst signal units (the concave parts 40b)) differs in each burst region from the first burst region Ab1b to the fourth burst region Ab4b. Here, regarding the burst pattern BP1b, the concave parts 40b formed in the first burst region Ab1b and the second burst region Ab2b correspond to "two types of burst signal units" for the present invention and regarding the burst pattern BP2b, the concave parts 40b formed in the third burst region Ab3b and the fourth burst region Ab4b correspond to "two types of burst signal units" for the present invention. In addition, on the magnetic disk 10B, the concave/convex patterns 40 are formed in each burst pattern region Abb so that the formation pitch along the radial direction of the concave parts 40b in each burst region from the first burst region Ab1b to the fourth burst region Ab4b (a length equal to the distance between the centers in the radial direction of the concave parts 40b in each burst region: the length L22 in FIG. 17) is equal. Here, on the magnetic disk 10B, the length L22 is double the track pitch Tp (an example where "N=2" for "(2·M/N)·Track Pitch").

Also, on the magnetic disk 10B, the concave parts 40b are formed in the first burst region Ab1b to the fourth burst region Ab4b so that four (one example of "2·M") centers C1b, C2b, . . . in the radial direction of the burst patterns BP1b, BP2b, . . . are present at intervals equal to half the track pitch Tp (i.e., "(1/N)·Track Pitch") in a range whose length L20 along the radial direction is produced by multiplying the track pitch Tp by (2·M/N) (i.e., (2·M/N)·Track Pitch": in this example, double the track pitch) where both ends of the length L20 in the radial direction (positions shown by the dot-dash lines in FIG. 17) do not match the centers C1b, C2b, . . . in the radial direction of the burst patterns BP1b, BP2b, . . . (such range is referred to as a "predetermined range" for the present invention). On the magnetic disk 10B, the concave/convex patterns 40 are formed in each burst pattern region Abb so that the center C1b in the radial direction of the burst pattern BP1b matches a center (track center) in the radial direction of a data recording track (convex parts 40a formed in the data recording regions At) (i.e., the distance between the center C1b of the burst pattern BP1b and the center of the data recording track is "0") and the distance (length L25) between the center C2b in the radial direction of a burst pattern BP2b and the center in the radial direction of a data recording track is half the track pitch Tp.

The burst patterns BP1b are formed so that the concave parts 40b formed in the first burst region Ab1b and the concave parts 40b formed in the second burst region Ab2b are separated from each other in the direction of rotation via convex parts 40a (one example where the burst patterns BP1b are formed so that "a first type of burst signal units and a second type of burst signal units out of the two types of burst signal units do not overlap in the direction of rotation"). In addition, in the burst patterns BP1$b$, the centers in the radial direction of the concave parts 40$b$ formed in the first burst region Ab1$b$ and the centers in the radial direction of the concave parts 40$b$ formed in the second burst region Ab2$b$ are separated in the radial direction by a length L23 equal to the track pitch Tp ("(M/N)·Track Pitch" for the present invention). In the burst patterns BP1$b$, the concave/convex patterns 40 are formed so that end regions including facing end parts out of the end parts in the radial direction of the concave parts 40$b$ formed in the first burst region Ab1$a$ and the concave parts 40$b$ formed in the second burst region Ab2$b$ overlap in the radial direction by a length L24 that is narrower than the track pitch Tp ("(M/N)·Track Pitch"). Here, on the magnetic recording medium according to the present invention, it is not necessary for end regions of the concave parts 40$b$ in the first burst region Ab1$b$ and end regions of the concave parts 40$b$ of the second burst region Ab2$b$ to overlap by the length L24 in the radial direction in the entire range from the inner periphery region to the outer periphery region, and it is possible to use a construction where the end regions of the concave parts 40$b$ overlap in the radial direction in only an arbitrary region. It is also possible for the length L24 to differ as desired in respective regions from the inner periphery region to the outer periphery region without the length L24 being set at the same length from the inner periphery region to the outer periphery region. Since the sensitivity of the PES increases as the length L24 increases, if there is the risk of the PES sensitivity being insufficient in the inner periphery, for example, it is possible to use a construction where the length L24 gradually increases on the magnetic disk 10B from the outer periphery to the inner periphery.

The burst patterns BP2$b$ are formed so that the concave parts 40$b$ formed in the third burst region Ab3$b$ and the concave parts 40$b$ formed in the fourth burst region Ab4$b$ are separated from each other in the direction of rotation via convex parts 40$a$ (one example where the burst patterns BP2$b$ are formed so that "a first type of burst signal units and a second type of burst signal units out of the two types of burst signal units do not overlap in the direction of rotation"). In addition, in the burst patterns BP2$b$, the centers in the radial direction of the concave parts 40$b$ formed in the third burst region Ab3$b$ and the centers in the radial direction of the concave parts 40$b$ formed in the fourth burst region Ab4$b$ are separated in the radial direction by the length L23 equal to the track pitch Tp ("(M/N)·Track Pitch" for the present invention). In the burst patterns BP2$b$, the concave/convex patterns 40 are formed so that end regions including facing end parts out of the end parts in the radial direction of the concave parts 40$b$ formed in the third burst region Ab3$b$ and the concave parts 40$b$ formed in the fourth burst region Ab4$b$ overlap in the radial direction by the length L24 that is narrower than the track pitch Tp ("(M/N)·Track Pitch").

Here, on the magnetic recording medium according to the present invention, it is not necessary for end regions of the concave parts 40$b$ in the third burst region Ab3$b$ and end regions of the concave parts 40$b$ in the fourth burst region Ab4$b$ to overlap by the length L24 in the radial direction in the entire range from the inner periphery region to the outer periphery region, and it is possible to use a construction where the end regions of the concave parts 40$b$ overlap in the radial direction in only an arbitrary region. It is also possible for the length L24 to differ as desired in respective regions from the inner periphery region to the outer periphery region without the length L24 being set at the same length from the inner periphery region to the outer periphery region. Since the sensitivity of the PES increases as the length L24 increases, if there is the risk of the PES sensitivity being insufficient in the inner periphery region, for example, it is possible to use a construction where the length L24 gradually increases on the magnetic disk 10B from the outer periphery to the inner periphery. Note that to carry out the recording and reproducing of recording data properly, the actuator 3$b$ described above (as one example, a VCM) is normally designed so that the tracking precision (mechanical precision) is 5% or below of the track pitch Tp. In other words, during the recording and reproducing of recording data, the magnetic head 3 driven by the actuator 3$b$ constantly makes minute movements in the radial direction of the magnetic disk 10B in a predetermined range with an upper limit of around 5% of the track pitch Tp. Accordingly, to reliably improve the sensitivity of the PES, the length L24 (the amount by which the two types of burst signal units that construct a burst pattern overlap in the radial direction) in the burst patterns BP1$b$, BP2$b$ described above should preferably be at least 5% of the track pitch Tp.

The above magnetic disk 10B is formed as described above so that both "M" and "N" for the present invention are "2". Accordingly, if the values of "M=2" and "N=2" are substituted into a condition "$(1-M)\cdot Tp/N+BW \leqq Wr \leqq (3\cdot M-1)\cdot Tp/N-BW$" to be satisfied by the magnetic recording medium according to the present invention, the magnetic disk 10B will satisfy the above condition so long as the width Wr of a reproducing element Rb of the magnetic head 3 is equal to or greater than a width Wr1$b$ that is "a length produced by subtracting half the track pitch Tp from the length L21" (see FIG. 17) and equal to or less than a width Wr2$b$ that is "a length produced by subtracting the length L21 from 5/2 times the track pitch Tp" (see FIG. 17). In the present specification, as one example, the case where the width Wr of the reproducing element Rb of the magnetic head 3 is "the length L21 minus half the track pitch Tp" is described. Note that the width (the minimum width Wr1$b$ and the maximum width Wr2$b$) of the reproducing element Rb of the magnetic head 3 when using the magnetic disk 10B is described in detail later.

When manufacturing the magnetic disk 10B described above, the preform 20 shown in FIG. 6 and the stamper 30 shown in FIG. 7 are used in the same way as when manufacturing the magnetic disk 10A described above. The stamper 30 for manufacturing the magnetic disk 10B is another example of a "stamper for manufacturing a magnetic recording medium" according to the present invention and has formed thereupon a concave/convex pattern 39 that can form a concave/convex pattern 41 for forming the concave/convex patterns 40 (the data track patterns 40$t$ and the servo patterns 40$sb$) on the magnetic disk 10B so that the magnetic disk 10B can be manufactured by imprinting. In this case, the concave/convex pattern 39 of the stamper 30 is formed so that convex parts 39$a$ correspond to the concave parts 40$b$ (non-recording regions as "one of the regions" for the present invention) in the concave/convex patterns 40 of the magnetic disk 10B, and concave parts 39$b$ correspond to the convex parts 40$a$ (recording regions as "other of the regions" for the present invention) in the concave/convex patterns 40. Note that the method of manufacturing the magnetic disk 10B by imprinting using a stamper is the same as the method of manufacturing the magnetic disk 10A described above, and therefore detailed description thereof is omitted.

Figure 18:
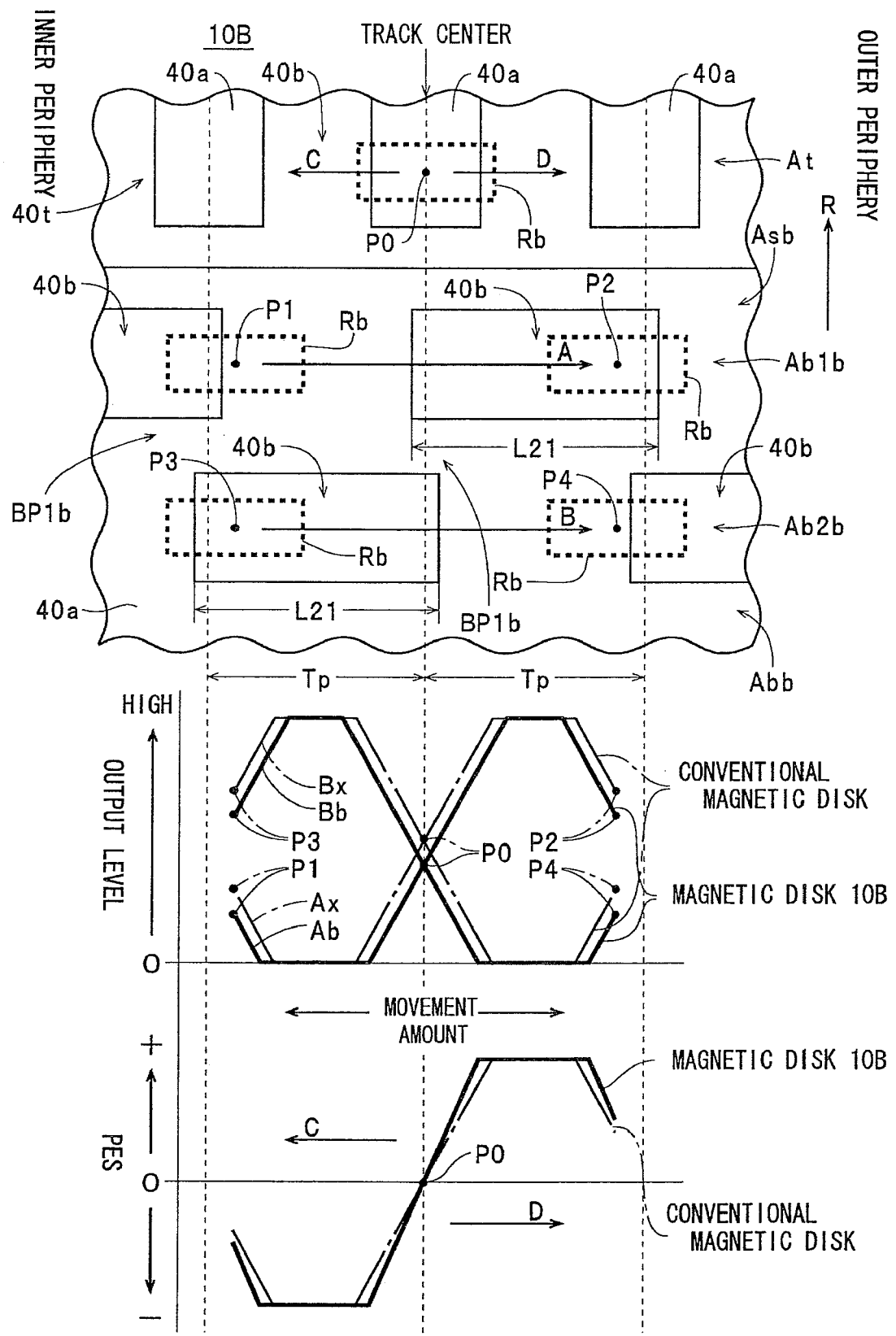
FIG. 18 is a diagram useful in explaining the relationship between (i) positions (movement amounts) of a reproducing element on the magnetic disk and (ii) an output level of an output signal from a magnetic head and a PES.

As shown in FIG. 18, the burst patterns BP1$b$ are formed on the magnetic disk 10B so that end regions including end parts in the radial direction of the concave parts 40$b$ formed in the first burst region Ab1$b$ and end regions including end parts in the radial direction of the concave parts 40$b$ formed in the second burst region Ab2$b$, for example, overlap one another in the radial direction at the track centers (the centers of data recording tracks in the radial direction). Accordingly, on the magnetic disk 10B, the length L21 along the radial direction of the concave parts 40b (burst signal units) formed in the burst regions Ab1b, Ab2b is longer than the track pitch Tp. As a result, when the position of the magnetic head 3 relative to the magnetic disk 10B changes and the magnetic head 3 (the reproducing element Rb) moves relative to the magnetic disk 10B in the direction of the arrow A from the position P1 to the position P2, for example, the output level of the output signal from the magnetic head 3 in the first burst region Ab1b is shown by the solid line Ab. Also, when the magnetic head 3 moves relative to the magnetic disk 10B in the direction of the arrow B from the position P3 to the position P4, for example, the output level of the output signal from the magnetic head 3 in the second burst region Ab2b is shown by the solid line Bb. In this case, if the output signal shown by the solid line Ab is set as S1 and the output signal shown by the solid line Bb is set as S2, the PES obtained from the burst pattern BP1b is "(S1−S2)/(S1+S2)". Accordingly, the PES obtained by the burst pattern BP1b has the characteristics shown by the solid line in FIG. 18.

On the other hand, on the conventional magnetic disk 10x1, as described earlier, when the magnetic head (the reproducing element Rx) moves relative to the magnetic disk 10x1 in the direction of the arrow A from the position P1 to the position P2, for example, the output level of the output signal from the magnetic head is shown by the dot-dash line Ax. Also, when the magnetic head moves relative to the magnetic disk 10x1 in the direction of the arrow B from the position P3 to the position P4, for example, the output level of the output signal from the magnetic head is shown by the dot-dash line Bx. As a result, the PES obtained from the servo patterns Ps1, Ps2 on the conventional magnetic disk 10x1 has the characteristics shown by the dot-dash line shown in FIG. 18. In this case, when the magnetic head 3 moves in the directions of the arrows C, D from a state where the magnetic head 3 is positioned at the position P0 (in this example, the track center), although the amount of change in the PES relative to the movement amount of the magnetic head 3 is sufficiently large with the magnetic disk 10B, the amount of change in the PES relative to the movement amount of the magnetic head is smaller with the magnetic disk 10x1 than with the magnetic disk 10B. Accordingly, with the magnetic disk 10B, even when the magnetic head 3 is displaced from the track center by only a minute amount, it is possible to detect such displacement based on the PES.

On the magnetic disk 10B, as described above, the data track patterns 40t and the servo patterns 40sb are formed so that the width Wr of the magnetic head 3, the formation pitch (the track pitch Tp) along the radial direction of the convex parts 40a in the data track pattern 40t, and the length L21 ("BW" for the present invention) along the radial direction of the concave parts 40b formed in the first burst region Ab1b to the fourth burst region Ab4b satisfy the condition "(1−M)·Tp/N+BW≦Wr≦(3·M−1)·Tp/N−BW". Accordingly, with the magnetic disk 10B, the width Wr of the reproducing element Rb can be defined with comparatively freely without the width Wr of the reproducing element Rb being primarily determined by the lengths of the various parts of the data track patterns 40t and the servo patterns 40sb. In other words, unlike the conventional magnetic disk 10x1, the lengths of the various parts of the data track patterns 40t and the servo patterns 40sb can be set without being primarily determined by the width Wr of the reproducing element Rb of the magnetic head 3.

Figure 19:
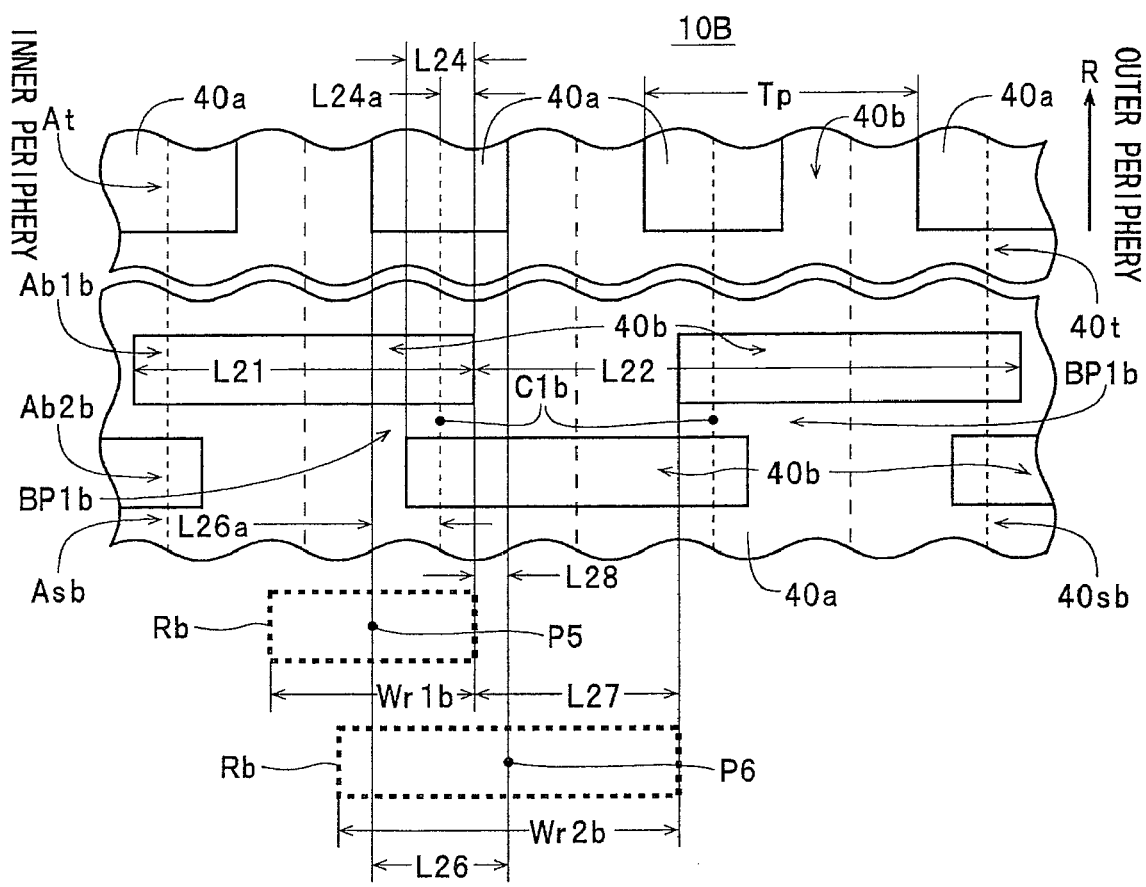
FIG. 19 is a diagram useful in explaining the relationship between the servo patterns on the magnetic disk and the width of the reproducing element.

More specifically, as shown in FIG. 19, on the magnetic disk 10B, the length L22 that is the formation pitch along the radial direction of the concave parts 40b formed in the first burst region Ab1b is double the track pitch Tp (i.e., "(M/N)·Tp·2"). In this case, the length L22 described above is equal to the length L20 described above (a length along the radial direction of a "predetermined range" for the present invention). This means that on the magnetic disk 10B, four (i.e., "2·M") centers C1b, C2b, . . . in the radial direction of the burst patterns BP1b, BP2b, . . . are present at intervals of half the track pitch Tp ((1/N)·Track Pitch) within a range of the length L22. More specifically, the concave parts 40b (burst signal units) in the first burst region Ab1b to the fourth burst region Ab4b are formed so that the centers C1b, C2b, . . . of the burst patterns BP1b, BP2b, . . . are present near both ends of the concave parts 40b in the radial direction. Accordingly, in the first burst region Ab1b, for example, the centers C1b in the radial direction of two burst patterns BP1b are present in the range of the length L22 described above that is the formation pitch along the radial direction of the concave parts 40b. Also, the centers C1b, C2b in the radial direction of two sets (M sets) of burst patterns BP1b, BP2b, that is, four (2·M) centers C1b, C2b, . . . are present in the range of the length L22.

Accordingly, on the magnetic disk 10B, a length L26 along the radial direction of the range in which tracking servo control is to be performed for the magnetic head 3 based on the PES obtained from one burst pattern BP1b, for example, is one quarter (1/(2·M)) of the length L22 described above. In this case, the length L26 is the half the track pitch Tp (i.e., (M/N)·Tp·2/(2·M)=(1/N)·Tp), and on the magnetic disk 10B, half the track pitch Tp is the length L26 that is equal to the width of the data recording tracks and the width of the inter-track concave parts. That is, on the magnetic disk 10B, the range for which tracking servo control is to be carried out for the magnetic head 3 based on the PES obtained from the burst pattern BP1b is within the range of the length L26 that is equal to the width of the data recording tracks and the width of the inter-track concave parts. Also, the length L24 that is the amount by which the end regions including the end parts of the concave parts 40b formed in the first burst region Ab1b and the end regions including the end parts of the concave parts 40b formed in the second burst region Ab2b overlap in the radial direction is a length (BW−(M/N)·Tp) produced by subtracting half the length L22 from the length L21 of the concave parts 40b, and is equal to a length produced by subtracting the track pitch Tp from the length L21.

Here, in a state where the reproducing element Rb is located at the position P5 that is one end part of the range (length L26) for which tracking servo control is to be carried out (i.e., in a state where the center in the width direction of the reproducing element Rb is above the position P5), if the width Wr of the reproducing element Rb is narrower than the width Wr1b in FIG. 19, a gap is produced in the radial direction (the direction of tracking servo control) between the end parts of the reproducing element Rb and the end parts of the concave parts 40b formed in the first burst region Ab1b. Since this gap is a dead zone, the width Wr of the reproducing element Rb needs to be equal to or greater than the width Wr1b shown in FIG. 19. As shown in FIG. 19, the width Wr1b is double the total of the length L24a and the length L26a. Here, the length L24a is half of the length L24 and the length L26a is half of the length L26 (i.e., Tp/(2·N)). That is, half the width Wr1b is a length (1−M)·Tp/(2·N)+BW/2 produced by subtracting ¼ of the track pitch Tp from the total of (i) half the length (the length L24 described above) produced by subtracting the track pitch Tp from the length L21 (i.e., the length L24a: BW/2−(M/N)·Tp/2) and (ii) half of half the track pitch Tp (the length L26 described above) (the length L26a: Tp/(2·N)), or in other words, by subtracting ¼ of the track pitch Tp from half the length L21. Accordingly, the width Wr1$b$ is a length produced by subtracting "(M−1)·Tp/N", which is half the track pitch Tp, from the length L21 (BW), which matches the "(1−M)·Tp/N+BW" term in the condition of the present invention.

On the other hand, in a state where the reproducing element Rb is located at the position P6 that is another end part of the range for which tracking servo control is to be carried out (the length L26) (i.e., in a state where the center of the reproducing element Rb in the width direction is above the position P6), if the width Wr of the reproducing element Rb is wider than the width Wr2$b$ shown in FIG. 19, the end part of the reproducing element Rb protrudes in the radial direction (the direction in which tracking servo control is carried out) onto an adjacent concave part 40$b$ formed in the first burst region Ab1$b$. Since the protruding amount is a dead zone, the width Wr of the reproducing element Rb needs to be equal to or below the width Wr2$b$ shown in FIG. 19. The width Wr2$b$ is double the length produced by subtracting a length L28 from a length L27 ((M/N)·Tp·2−BW) produced by subtracting the length L21 from the length L22. Here, the length L28 is produced by subtracting the length L24$a$ from half the length L26, that is, by subtracting the length L24$a$ (BW/2−(M/N)·Tp/2) from half the length L26 that itself is half the track pitch Tp (i.e., half the length L26=Tp/(2·N)). That is, half the width Wr2$b$ is the total ((3·NM−1)·Tp/(2·N)−BW/2) of (i) a length produced by subtracting ¼ of the track pitch Tp (i.e., Tp/(2·N)) from the length L27 and (ii) the length L24$a$. Accordingly, the width Wr2$b$ is a length produced by subtracting the length L21 (BW) from ((3·M−1)·Tp/N) that is ⁵⁄₂ times the track pitch Tp, which matches the "(3·M−1)·Tp/N−BW" term in the condition for the present invention.

As described above, the track pitch Tp and the length L26 on the magnetic disk 10B are set so as to satisfy the condition "(1−M)·Tp/N+BW≦Wr≦(3·M−1)·Tp/N−BW". Accordingly, for reproducing elements Rb of various widths Wr in a range from the width Wr1$b$ to the width Wr2$b$ set as described above, with the magnetic disk 10B, the position of the magnetic head 3 (the reproducing element Rb) above the magnetic disk 10B can be specified without producing dead zones. Here, with the magnetic disk 10B, the burst patterns BP1$b$, BP2$b$, . . . are formed in the burst pattern regions Abb so that the interval along the radial direction between the centers C1$b$, C2$b$, . . . in the radial direction of the burst patterns BP1$b$, BP2$b$ . . . is (½)·track pitch Tp (an example where N=2 for (1/N·track pitch)). Accordingly, in the same way as with the magnetic disk 10A described above, even if the width Wr of the reproducing element Rb is narrower than the track pitch Tp, it will be possible to specify the position of the magnetic head 3 (the reproducing element Rb) above the magnetic disk 10B without a dead zone being produced. This means that by using a reproducing element Rb whose width Wr is narrower than the track pitch Tp as necessary, it is possible to avoid "side reading".

Also, with the magnetic disk 10B, the formation pitch in the radial direction of the burst patterns BP1$b$, BP2$b$, . . . is set at (½)·the track pitch Tp (an example where N, which is a natural number of two or higher, is 2 for the term "(1/N)·Track Pitch"). Accordingly, in the same way as with the magnetic disk 10A described above, a process that positions the reproducing element Rb at a track center based on the value of the PES can be carried out easily. Also, by having the centers C1$b$ along the radial direction of the burst patterns BP1$b$ match the track centers, it is possible to specify that the reproducing element Rb is positioned at a track center when the value of the PES is "0". By doing so, as with the magnetic disk 10A, it is possible to easily position the reproducing element Rb on a track center without a complex process being necessary.

In this way, according to the magnetic disk 10B and the hard disk drive 1, by forming the burst signal units so that M sets (in the above example, two sets) of burst patterns BP1$b$, BP2$b$, . . . with two types of burst signal units constructed of concave parts 40$b$ (non-recording regions) are formed and so that in at least one part (as one example, the entire region) out of the regions from the inner periphery region to the outer periphery region, end regions including facing end parts in the radial direction of the concave parts 40$b$ formed in the first burst region Ab1$b$ and the second burst region Ab2$b$ overlap in the radial direction and end regions including facing end parts in the radial direction of the concave parts 40$b$ formed in the third burst region Ab3$b$ and the fourth burst region Ab4$b$ overlap in the radial direction, it is possible to sufficiently increase the amount by which the PES changes (i.e., the PES sensitivity) with respect to the amount by which the magnetic head 3 (the reproducing element Rb) moves relative to the magnetic disk 10B. As a result, even if the output signal from the magnetic head 3 becomes weaker due to an increase in track density, it is possible to reliably detect extremely small displacements and properly carry out tracking servo control. Also, unlike the conventional magnetic disk 10$x$1 where there is only one set of burst patterns (i.e., where M=1), there is no need for the width Wr of the reproducing element Rb of the magnetic head 3 to match the track pitch Tp, and therefore the data track patterns 40$t$ and the servo patterns 40$sb$ can be designed with increased freedom. Also, unlike the conventional magnetic disk 10$x$2 where there are two (M=2) sets of burst patterns but the centers in the radial direction of the burst patterns are disposed at intervals equal to the track pitch, the width Wr of the reproducing element Rb does not need to be wider than the track pitch Tp, and therefore it is possible to sufficiently suppress "side reading".

According to the hard disk drive 1 equipped with the magnetic disk 10B, by forming the burst patterns BP1$b$, BP2$b$ of the magnetic disk 10B so that the condition to be satisfied by the magnetic recording medium according to the present invention "(1−M)·Tp/N+BW≦Wr≦(3·M−1)·Tp/N−BW" is satisfied, it is possible to sufficiently increase the PES sensitivity by using a magnetic head 3 with a reproducing element Rb with a width Wr that satisfies the above condition without producing dead zones for the burst patterns, which makes it possible to carry out proper tracking servo control. Here, unlike the conventional magnetic disk 10$x$1, since the track pitch Tp and the length L21 along the radial direction of the burst signal units (the concave parts 40$b$) are not primarily determined by the width of the reproducing element Rb, the data track patterns and the servo patterns can be designed with increased freedom. By doing so, it is possible to suitably change the track pitch Tp and the length L21 along the radial direction of the burst signal units (the concave parts 40$b$) in accordance with objects such as increasing the track density and avoiding side reading. Also, unlike the conventional magnetic disk 10$x$2, the width Wr of the reproducing element Rb does not need to be made wider than the track pitch Tp, and therefore side reading can be sufficiently avoided. By doing so, it is possible to provide a hard disk drive 1 equipped with a magnetic disk 10B capable of high-density recording and not susceptible to reproducing errors.

In addition, according to the stamper 30 described above, by providing a concave/convex pattern 39 including convex parts 39$a$ formed corresponding to the concave parts 40$b$ (non-recording regions) of the concave/convex pattern 40 of the magnetic disk 10B and concave parts 39$b$ formed corresponding to the convex parts 40$a$ (recording regions) of the concave/convex pattern 40 of the magnetic disk 10B, it is possible to easily manufacture, using a method such as imprinting, a magnetic disk 10B with burst patterns BP1b, BP2b, . . . that can sufficiently increase the amount by which the PES changes (i.e., the PES sensitivity) with respect to the movement amount of the magnetic head 3 (the reproducing element Rb).

Note that the present invention is not limited to the constructions described above. For example, although two sets of burst patterns BP1a, BP2a are formed on the magnetic disk 10A and two sets of burst patterns BP1b, BP2b are formed on the magnetic disk 10B as the M sets of burst patterns for the present invention, the value of "M" is not limited to two and may be three or higher. In the same way, the value of "N" in the term "(1/N)·Track Pitch" that sets the distance between the centers in the radial direction (i.e., the intervals at which the centers are present) of the burst patterns according to the present invention is not limited to two as with the magnetic disks 10A, 10B described above, and any natural number of three or higher can be selected. In addition, with the magnetic disks 10A, 10B described above, although the burst patterns are formed so that one type of burst signal units and the other type of burst signal units for the present invention are separated from one another in the direction of rotation, such burst signal units do not need to be separated in the direction of rotation, and the burst patterns can be formed so that the burst signal units touch in the direction of rotation (another example of where the burst signal units are formed so that the burst signal units "do not overlap in the direction of rotation").

Figure 20:
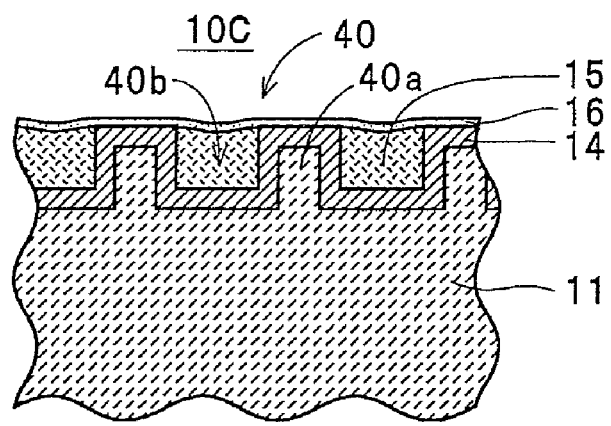
FIG. 20 is a cross-sectional view showing the layer construction of a magnetic disk.
Figure 21:
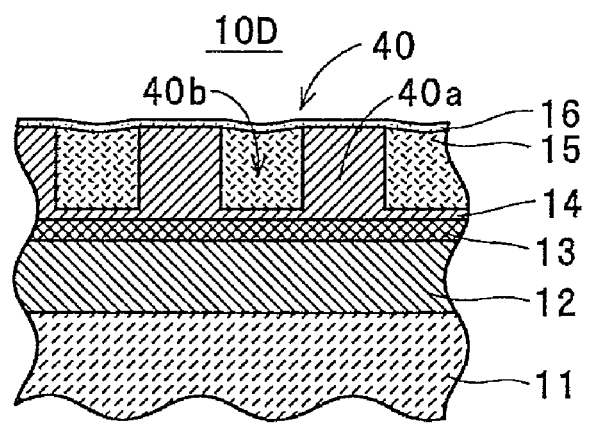
FIG. 21 is a cross-sectional view showing the layer construction of a magnetic disk.
Figure 22:
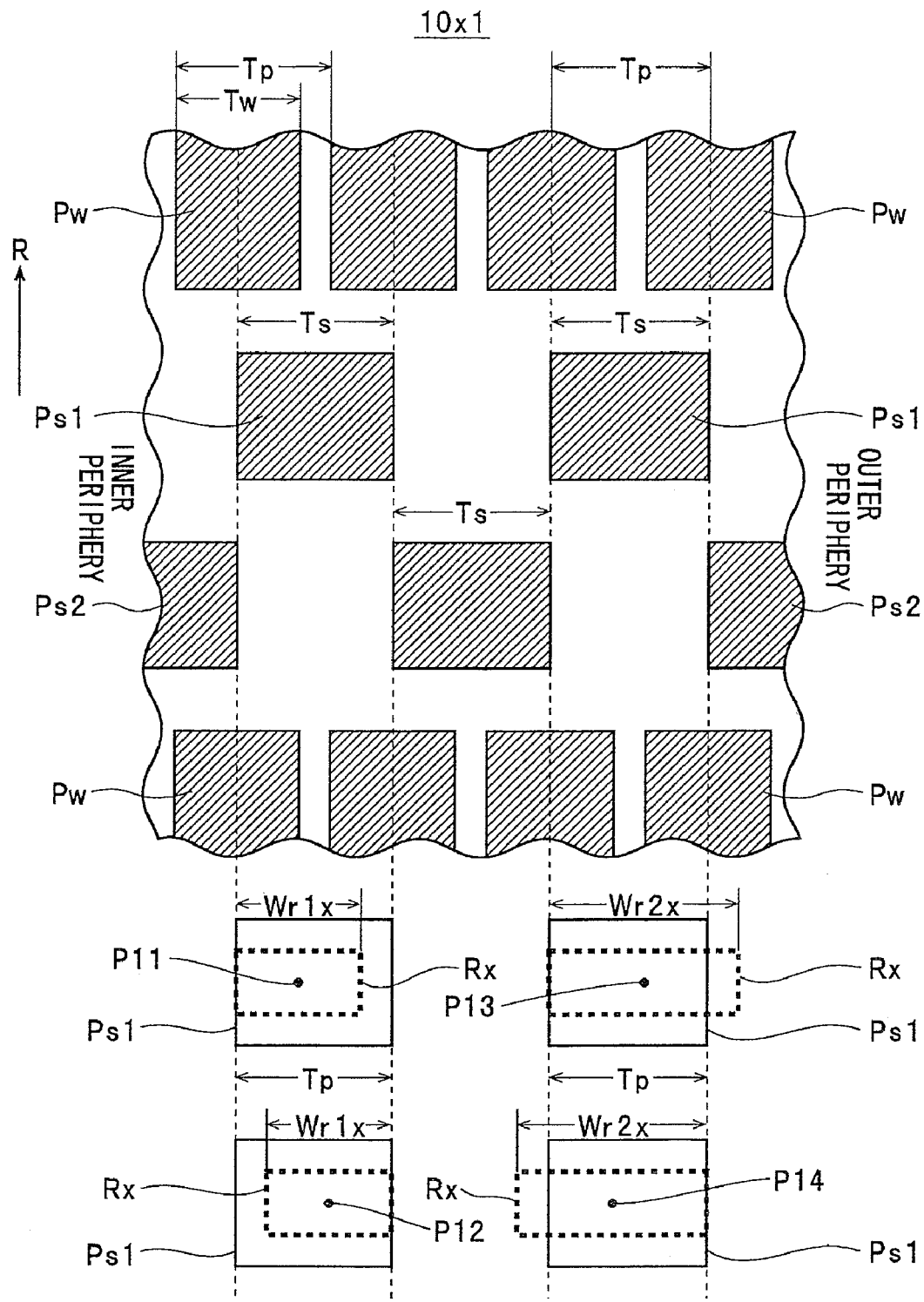
FIG. 22 is a plan view of a conventional magnetic disk showing one example of burst patterns.
Figure 23:
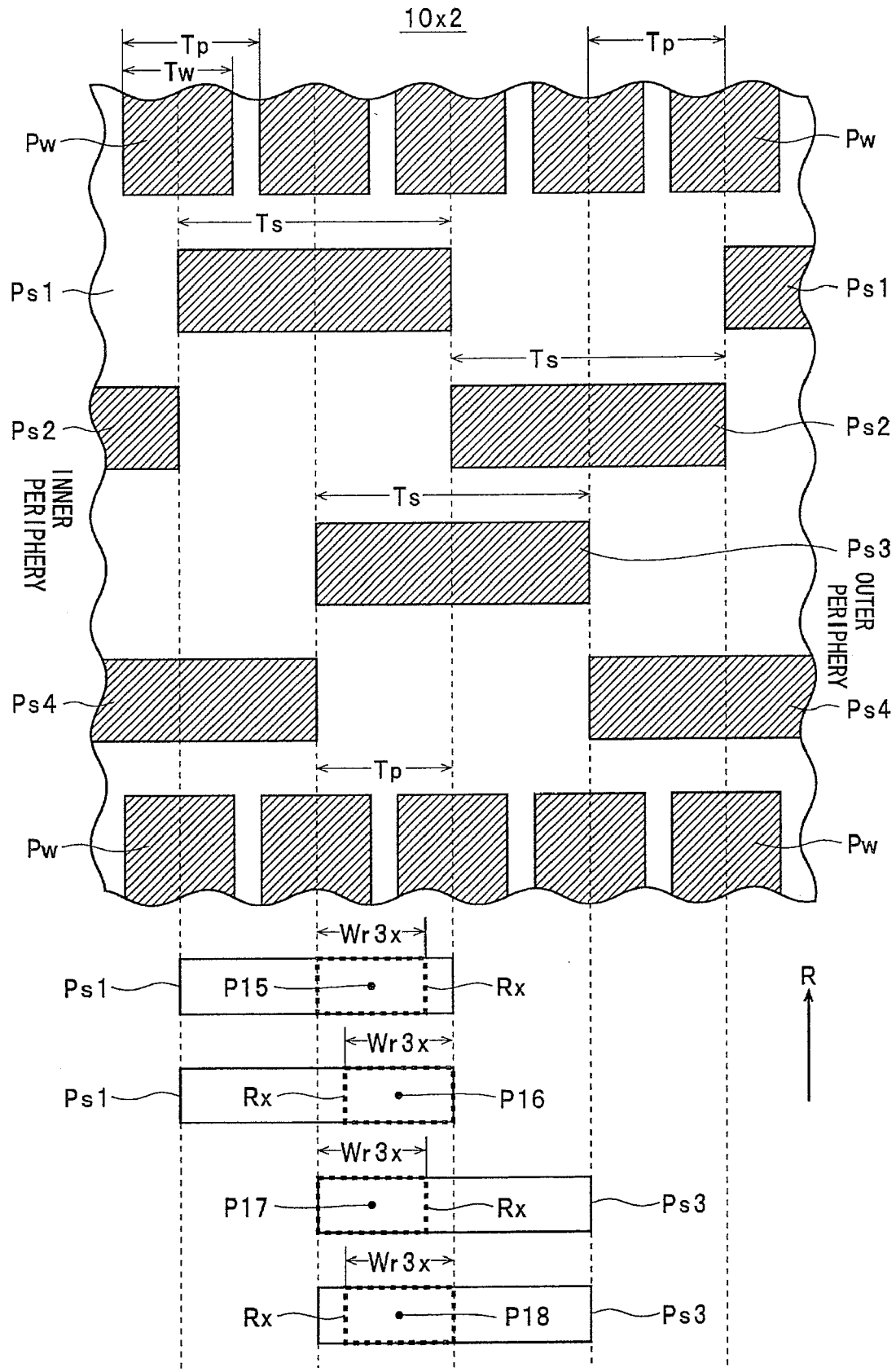
FIG. 23 is a plan view of another conventional magnetic disk showing one example of burst patterns.

In addition, on the magnetic disks 10A, 10B described above, although the entire convex parts 40a in the concave/convex patterns 40 from the protruding end parts (the surfaces of the magnetic disks 10A, 10B) to the base end parts thereof are formed of the magnetic layer 14 (magnetic material), the construction of the "recording regions" and the "non-recording regions" that construct the "pattern" for the present invention are not limited to this. More specifically, like a magnetic disk 10C shown in FIG. 20, for example, by forming a thin magnetic layer 14 so as to cover concave/convex patterns formed in the glass substrate 11 (concave/convex patterns where the concaves and convexes have the same positional relationship as the concave/convex patterns 40), it is possible to construct a concave/convex pattern 40 that corresponds to the "pattern" for the present invention from a plurality of convex parts 40a (recording regions) whose surfaces are formed of magnetic material and a plurality of concave parts 40b (non-recording regions) whose base surfaces are also formed of the magnetic material. Also, like a magnetic disk 10D shown in FIG. 21, it is possible to construct a concave/convex pattern 40 that corresponds to the "pattern" for the present invention where not only the convex parts 40a (recording regions) but also the base parts of the concave parts 40b (non-recording regions) are formed of the magnetic layer 14. As another example, although not shown, it is also possible to construct a concave/convex pattern 40 that corresponds to the "pattern" for the present invention so as to include convex parts 40a (recording regions) where only the protruding end parts (the surface side of the magnetic recording medium: the upper end parts in FIG. 21) of the convex parts 40a in the concave/convex pattern 40 are formed of the magnetic layer 14 and the base end parts of the convex parts 40a are formed of a non-magnetic material, a soft magnetic material, and the like. In this way, when forming the recording regions and non-recording regions of the magnetic recording medium according to the present invention using concave/convex patterns, by forming at least the protruding end parts of the convex parts that construct the recording regions from a magnetic material, it is possible to sufficiently increase the ability to store a magnetic signal in a readable manner compared to the non-recording regions.

Also, although the magnetic disks 10A, 10B have been described where the concave/convex patterns 40 including the convex parts 40a (recording regions) and the concave parts 40b (non-recording regions) are formed by forming a concave/convex pattern 42 using the concave/convex pattern 41 formed by imprinting where the concave/convex pattern 39 of the stamper 30 is transferred to the resin layer 18 of the preform 20 and then etching the magnetic layer 14 with the concave/convex pattern 42 as a mask, the construction and method of manufacturing a magnetic recording medium according to the present invention are not limited to such. As one example, although not shown, a magnetic recording medium can be constructed by forming, in a layer formed of various materials whose ability to store a magnetic signal in a readable manner is low or various materials (as one example, a non-magnetic material) that effectively cannot store a magnetic signal, concave/convex patterns (concave/convex patterns where the convex parts are formed of non-magnetic material or the like) where the positional relationship between concaves and convexes is reversed compared to the concave/convex patterns 40 described above, and then filling the concave parts in such concave/convex patterns with various materials (as one example, a magnetic material) whose ability to store a magnetic signal in a readable manner is high. On a magnetic recording medium manufactured according to this method of manufacturing, the formation regions of the convex parts in the concave/convex patterns formed in the layer of non-magnetic material or the like (concave/convex patterns where the positional relationship between concaves and convexes is reversed compared to the concave/convex patterns 40 of the magnetic disks 10A, 10B described above) correspond to "non-recording regions" for the present invention and the formation regions of the concave parts (regions filled with magnetic material) in the concave/convex patterns correspond to "recording regions" for the present invention.

In addition, when the concave/convex patterns are formed in the layer of non-magnetic material during the manufacturing of the above magnetic recording medium where magnetic material is used to fill concave parts in concave/convex patterns formed in a layer of non-magnetic material or the like, by using a stamper (not shown) with a concave/convex pattern where the positional relationship between the concaves and convexes is reversed compared to the concave/convex pattern 39 of the stamper 30 described above, it is possible to form a mask pattern by imprinting. This stamper (a stamper with a concave/convex pattern where the positional relationship between the concaves and convexes is reversed compared to the concave/convex pattern 39) is another example of a "stamper for manufacturing a magnetic recording medium" according to the present invention, on which convex parts are formed corresponding to recording regions (regions filled with magnetic material) as the "one region out of the recording regions and the non-recording regions" for the present invention and concave parts are formed corresponding to non-recording regions (formation regions of the convex parts in the concave/convex pattern formed in the layer of non-magnetic material or the like) as the "other regions" for the present invention.

In addition, although on the magnetic disks 10A, 10B described above, the data track patterns 40t are formed in the data recording regions At by concave/convex patterns 40 with a plurality of concentric or spiral convex parts 40a (recording regions), the present invention is not limited to such and it is possible to apply the present invention to a patterned medium where the recording regions that construct the data recording tracks in the data track patterns are separated from one another by having non-recording regions in between in the circumferential direction of the magnetic recording medium. It is also possible to apply the present invention to a magnetic recording medium where data track patterns are formed by magnetically writing various recording data in data recording regions constructed of a continuous magnetic layer, the servo patterns being formed by a pattern (for example, the concave/convex patterns 40 described above) including recording regions and non-recording regions. In addition, by partially changing the magnetic characteristics of a continuous magnetic layer, which is formed on a substrate, by ion irradiation or the like, it is possible to construct a magnetic recording medium (not shown) where a pattern including the recording regions and non-recording regions for the present invention are formed in a continuous magnetic layer. Also, the magnetic recording medium according to the present invention is not limited to a magnetic recording medium for perpendicular recording like the magnetic disks 10A, 10B, and can be applied to a magnetic recording medium for longitudinal recording.

What is claimed is:

1. A magnetic recording medium on which are formed:

servo patterns formed in servo pattern regions on at least one surface of a substrate by patterns including recording regions and non-recording regions; and data track patterns where a plurality of data recording tracks are formed with a predetermined track pitch in data recording regions on the at least one surface, wherein M sets of burst patterns are formed along a direction of rotation of the substrate in a burst pattern region in each servo pattern region, where M is a natural number of two or higher, each burst pattern is formed so as to include two types of burst signal units and (2M) centers in a radial direction of the substrate of the burst patterns are present in a predetermined range at intervals of (1/N) times the track pitch in the radial direction, the predetermined range has a first end and a second end and further has a length along the radial direction of (2M/N) times the track pitch (where N is a natural number of two or higher), and the first and second ends in the radial direction of the predetermined range do not match a center in the radial direction of the burst pattern, the two types of burst signal units are formed so that a length along the radial direction of a first type of burst signal units out of the two types of burst signal units is equal to a length along the radial direction of a second type of burst signal units out of the two types of burst signal units, and a distance from a center of the data track pattern to a center in the radial direction of the first type of burst signal units differs from a distance from a center of the data track pattern to a center in the radial direction of the second type of burst signal units, and the two types of burst signal units are constructed by the non-recording regions so that the first type of burst signal units and the second type of burst signal units out of the two types of burst signal units do not overlap in the direction of rotation, centers in the radial direction of the burst signal units of a same type are separated in the radial direction by (2·M/N) times the track pitch, centers in the radial direction of the first type of burst signal units and centers in the radial direction of the second type of burst signal units are separated in the radial direction by (M/N) times the track pitch, and in at least one part out of regions from an inner periphery region to an outer periphery region of the substrate, end regions including end parts positioned close to the second type of burst signal units out of both end parts in the radial direction of the first type of burst signal units and end regions including end parts positioned close to the first type of burst signal units out of both end parts in the radial direction of the second type of burst signal units overlap in the radial direction.

2. A recording/reproducing apparatus comprising:

a magnetic recording medium according to claim 1;

a magnetic head that reads a control signal used for tracking servo control from the servo pattern regions of the magnetic recording medium; and a control unit that carries out the tracking servo control based on the control signal read via the magnetic head, wherein the burst patterns are formed on the magnetic recording medium so as to satisfy a condition $$(1-M)\cdot Tp/N + BW \leq Wr \leq (3\cdot M-1)\cdot Tp/N - BW$$

where Wr is a reproducing head width of the magnetic head, BW is a length along the radial direction of the burst signal units, and Tp is the track pitch.

3. A stamper for manufacturing a magnetic recording medium, the stamper having a concave/convex pattern including convex parts formed corresponding to one region out of the recording regions and the non-recording regions of the patterns on the magnetic recording medium according to claim 1, and concave parts formed corresponding to other regions in the patterns on the magnetic recording medium.

* * * * *